United States Patent [19]

Cosentino et al.

[11] Patent Number: 4,866,638
[45] Date of Patent: Sep. 12, 1989

[54] PROCESS FOR PRODUCING HUMAN-COMPUTER INTERFACE PROTOTYPES

[75] Inventors: Patrick A. Cosentino, Scottsville; Amy L. Shea, Rochester; Michael E. Haefner, Honeoye; Douglas V. Ziegler, Rochester; Thomas E. Murphy, Rochester; Walter C. Bubie, Rochester, all of N.Y.

[73] Assignee: Eastman Kodak Company, Rochester, N.Y.

[21] Appl. No.: 163,829

[22] Filed: Mar. 4, 1988

[51] Int. Cl.⁴ .............................................. G06F 3/153
[52] U.S. Cl. .................................. 364/521; 364/900; 364/146; 364/188
[58] Field of Search ... 364/200 MS File, 900 MS File, 364/300 MS File, 146, 147, 518, 521, 188–193; 340/709, 721, 747

[56] References Cited

U.S. PATENT DOCUMENTS

| | | | |
|---|---|---|---|
| 4,451,895 | 5/1984 | Sliwkowski | 364/188 X |
| 4,455,619 | 6/1984 | Masui et al. | 364/147 X |
| 4,538,225 | 8/1985 | Banks et al. | 364/200 |
| 4,546,435 | 10/1985 | Herbert et al. | 364/300 |
| 4,570,217 | 3/1988 | Allen et al. | 364/188 |
| 4,656,582 | 4/1987 | Chaitin et al. | 364/300 |
| 4,656,603 | 4/1987 | Dunn | 364/721 X |
| 4,667,290 | 5/1987 | Goss et al. | 364/300 |
| 4,731,609 | 3/1988 | Reynolds et al. | 340/747 |

Primary Examiner—David L. Clark
Attorney, Agent, or Firm—Thomas H. Close

[57] ABSTRACT

A process for producing human-computer interface prototypes includes describing the interface prototype in a high-level graphics language having commands to describe asynchronous events, and to link asynchronous events to graphic objects. A graphic display portion of the interface prototype is managed such that the behavior of graphic objects follows the objects as they are repositioned in a display.

6 Claims, 5 Drawing Sheets

Microfiche Appendix Included
(1176 Microfiche, 33 Pages)

PROCESS FOR PRODUCING HUMAN-COMPUTER INTERFACE PROTOTYPES

Cross-reference to related applications U.S. patent application Ser. No. 163,391 filed Mar. 7, 1988 entitled USER INTERFACE MANAGER by D.J. Rosenberg; J.L. Underhill; W.C. Bubie; and A. Marcus.

A microfiche appendix comprising 33 fiche containing 1176 frames forms a part of this application.

A portion of the disclosure of this patent document contains material to which a claim of copyright protection is made. The copyright owner has no objection to the copying of the patent document or the patent disclosure, but reversed all other rights.

List of Appendices

Appendix A—High-level graphics language code for drawing a line segment

Appendix B—Complete specification of data structures

Appendix C—Intermediate code specification

Appendix D—Code for calculator prototype

Appendix E—Code for swapping UNDO icon and LINE icon in FIG. 4

Microfiche Appendices

Appendix I—Complete specification of all high-level graphics language commands

Appendix II—Compiler written in C for compiling high-level graphics language

Appendix III—Multiple Manager/Interpreter written in C

Appendix IV—Object Manager written in C

Appendix V—Input and Display Manager written in C

Appendix VI—Graphics Editor written in high-level graphics language

TECHNICAL FIELD OF THE INVENTION

The invention relates to a process for producing prototypes of human computer interfaces and more particularly to a process for transforming a high-level language description of such an interface into a series of machine executable steps that implement the prototype interface.

BACKGROUND OF THE INVENTION

An important feature of any computer system is the interface between the computer and the human operator. The commercial success or failure of computer systems often is due in a large part to the ease with which a human operator can use the system. An example of such a success is the Macintosh (trademark of Apple Computer Inc.) line of personal computers. The Macintosh line of personal computers is successful primarily because the components and interaction techniques used to complete tasks on the computers are very consistent throughout the product line. In addition, the concept of a "desktop" environment is depicted graphically in a meaningful manner, making common software components such as windows and icons easy to comprehend. Users are much more apt to understand how to complete a task if the same user interface components and techniques are repeated in each software application.

In developing a human computer interface it is necessary to generate many prototype interfaces, and to test them for ease of use with human operators. Because a large computer program lies at the heart of any sophisticated human-computer interface, it is very costly and time consuming to develop even one such interface, let alone a variety of prototypes which can be compared to each other to determine which one is preffered. For this reason, tools have been provided to aid in the specification and production of prototype human-computer interfaces.

Prior prototyping systems were unable to describe asynchronous events while a program was running in the high-level language used to create the prototypes. Typically, if asynchronous events, such as control of the mouse, had to be handled as part of the prototype, programmers were required to define those asynchronous events in a low-level programming language or by using a separate prototyping tool. In addition, if asynchronous events had to be linked to an item on the screen, the asynchronous event was linked to the X and Y coordinates of the item. This meant that if the item was moved to a new X and Y coordinates had to be specified to re-link the asynchronous event to the item.

For example, the BLOX (trademark of Rubel Software Inc.) interface development tool, uses state tables to describe states, changes of state ("transitions"), and actions for transitions. Each state table includes a test with one or more possible outcomes; each transition includes a possible action and entry to a new state. Table 1 below is a listing of BLOX code which would typically be used to draw line segments on a workstation in an interactive graphics application:

TABLE 1

| STATE | |
|---|---|
| Line__First__Point | TEST Get__Point__Coordinates |
| TRANSITION | |
| Drop__This__Point | NEW STATE Restart__Routine__1 |
| TRANSITION | |
| Record__First__Point | NEW STATE Line__Second__Point |
| STATE | |
| Line__Second__Point | TEST Get__Point__Coordinates |
| TRANSITION | |
| Drop__This__Point | NEW STATE Restart__Routine__2 |
| TRANSITION | |
| Draw__This__Line | NEW STATE Line__First__Point |

(Not shown above is the code for the tests GetPointCoordinates or the routine for the actions DropThisPoint, RecordFirstPoint, and DrawThis Line).

Using this state table, two states are identified and named GETTHELASTPOINT. The first state waits for mouse input to identify the line start point. Once received, the table tests to see if this point is within the screen work area (in this case, a window). Two transitions are then described for this test: one to enter a new state if the point is outside the work area, and a second to record the line start position and enter a new state to obtain the line end position. The second state waits for mouse input to identify the line end point and then tests to see if it is within the work area. Two more transitions are then described for this test: one to enter a new state if the point is outside the work area, and a second to draw the line and return to the initial state, thus restarting the cycle.

In prior art prototyping systems, the graphic elements consisted of a bitmap or a display list of graphic objects. The program used to execute the prototype could only interpret a bitmap or a display list, but not both.

Thus it is an object of the present invention to provide a process for producing prototypes of human-computer interfaces that avoids the limitations of the prior art processes discussed above.

SUMMARY OF THE INVENTION

The object is achieved by describing an interface prototype in a high-level graphics language having commands to describe asynchronous events, and to link asynchronous events to graphic objects. The high level graphic language description is compiled in a compiler to produce an intermediate low-level code that is optimized for interpretation. The low-level code is interpreted to implement the prototype interface. According to a further feature of the process, a graphic display portion of the human-computer interface is managed such that the behavior of graphic objects follows the graphic objects as they are repositioned in a display.

DESCRIPTION OF THE INVENTION

Figure 1:
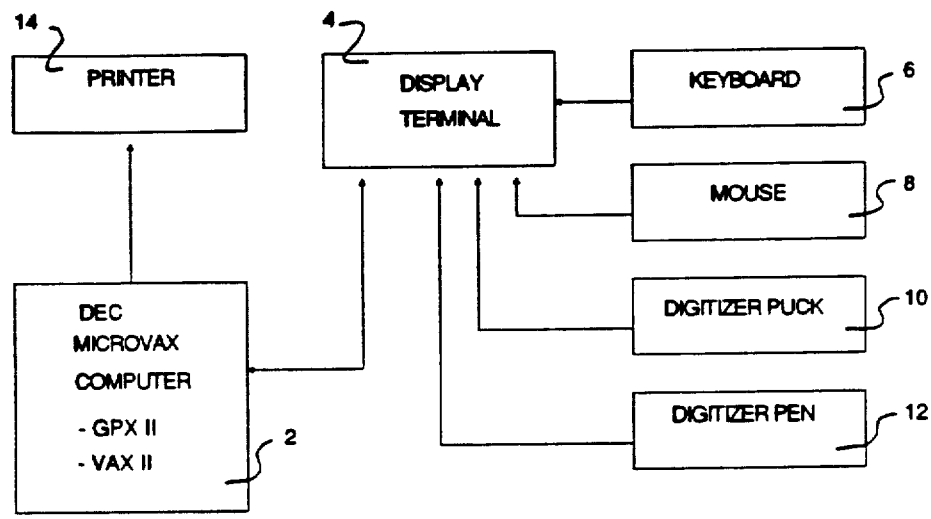
FIG. 1 is a schematic diagram of a computer system useful for practicing the method of the invention.

FIG. 1 is a schematic diagram of a computer system on which the method of the present invention may be performed. A Microvax GPX II* or VAX II* computer 2, running the VMS* operating system, is used to store, process, and manipulate data (* registered trademarks of Digital Equipment Corporation). The Microvax computer contains a 72 Mb disk drive (not shown) and connects to a display terminal 4, which is typically a workstation with windowing capabilities. User inputs are accepted from a keyboard 6, a mouse 8, a digitizer puck 10, or a digitizer pen 12. Hardcopy output can also be directed to a printer 14.

This invention can run on other types of hardware; however, alterations must be made to the input/output functions of the workstation graphics software to accommodate the new devices.

The process employs a specialized high-level graphics language described below. This language provides great flexibility and ease in describing asynchronous events, linking them to screen items, and changing basic interface characteristics during program execution.

The high-level graphics language is structured as shown in Table 2. This language consists of a main section and optional procedures that follow. The main section begins with the statement begin main. and ends with the statement endmain. Any number of statements, consisting of commands, procedure calls, or comments, can fall between the two main statements. In this language, all variables are global and comments can be placed anywhere.

TABLE 2

| |
|---|
| begin main. |
| statement 1 |
| statement 2 |
| . |
| . |
| statement n |
| endmain. |

A complete specification of all the commands employed in the high-level graphics language is contained in Microfiche Appendix I. Table 3 depicts the types of control statements typically used in the high-level graphics language.

TABLE 3

| Type | Format/Example | Description |
|---|---|---|
| Non-data-passing statement | do procedure_name. | Causes the program to immediately execute the procedure indicated and return to the next statement upon completion. |
| While loop statement | while condition then: do procedure_name. counter = counter +1. endwhile. | Repeats a set of actions as long as a condition remains true. |
| If . . . then statement | if condition then: do procedure_name. counter = counter+1. otherwise: counter = counter −1. break. endif. | Executes an action as long as a condition is true and describes how to proceed if the condition is not true. |
| Wait | wait 2.6 seconds. | Suspends program statement execution for the specified time period; then continues with the next statement. |
| Sleep statement | sleep. | Suspends the program until it is interrupted by an asynchronous event. |
| Break statement | break. | Breaks the program out of a while loop or procedure and continues with the statement |

TABLE 3-continued

| Type | Format/Example | Description |
| --- | --- | --- |
| | | following endwhile or endprocedure. |
| Wake up statement | wakeup. | Brings the program out of suspension and executes the statement after sleep. |
| Exit | exit. | Exits from the program. |

In comparison to prior systems, the high-level graphics language used in this invention simplifies the description of an asynchronous event while the program is executing. A typical asynchronous event is the need to write code so that if the screen is scrolling information and a user presses a mouse button, the terminal "beeps" to indicate an invalid entry. The high-level graphics language allows programmers to write code easily and in a more natural language to handle asynchronous events: prior systems required that programmers resort to a low-level language or another prototyping tool to write such code. Asynchronous events are both created and linked to a specific behavior using the high-level graphics command SETUP. A typical SETUP command is shown in table 4:

TABLE 4

```
SETUP a condition named (condition_name) such that
whenever the button (mouse button_name) is clicked
within the object (object_name) then:
(any other high-level graphics commands can
come here)
ENDSETUP
```

To activate this condition, the START command is used as shown in table 5:

TABLE 5

START a condition named (condition_name).

To stop the condition from executing, the STOP command is used as shown in table 6:

TABLE 6

STOP a condition named (condition_name).

Appendix A contains a listing in the high-level graphics language describing a typical asynchronous event: drawing a line segment on a workstation in an interactive graphics application.

The process according to the present invention makes use of a unique data structure to allow programmers to link an asynchronous event to a specific item the description of the asynchronous event; on the screen by storing the item and the behavior of the object in response to the event as a single object, regardless of the X and Y location of the item on the screen. For example, a circle drawn on the screen is defined as Graphic Object Type A and an alarm should sound when an asynchronous event, such as clicking the mouse, occurs. In this invention, all of this information is defined by the high-level graphics program and stored as one object. If the circle is moved to new X and Y location at some future data, the code used to handle the asynchronous event remains linked to it.

The unique data structures also permit image (bit-map) files and display list (graphic) files to be stored in the same database and assigned the same "object" characteristics. This differs from prior system where graphic files were stored as bitmaps or display lists in the database and treated only as bitmaps or display lists by the system. In addition, the high-level graphics language of this invention treats "objects," whether bitmaps or graphic objects, in exactly the same manner during program execution. Table 7 below depicts a typical object data structure used for images in this invention; complete data structures are listed in Appendix B.

TABLE 7

. Image Unique Fields
  .. Number of Blocks of n bits in the Array
  .. Array of Blocks
  .. Image Raster Width
  .. Image Raster Height
  .. Number of Bits per Pixel
. Fields Common to All Objects:
  .. Field 1

.. Field n

Figure 2:
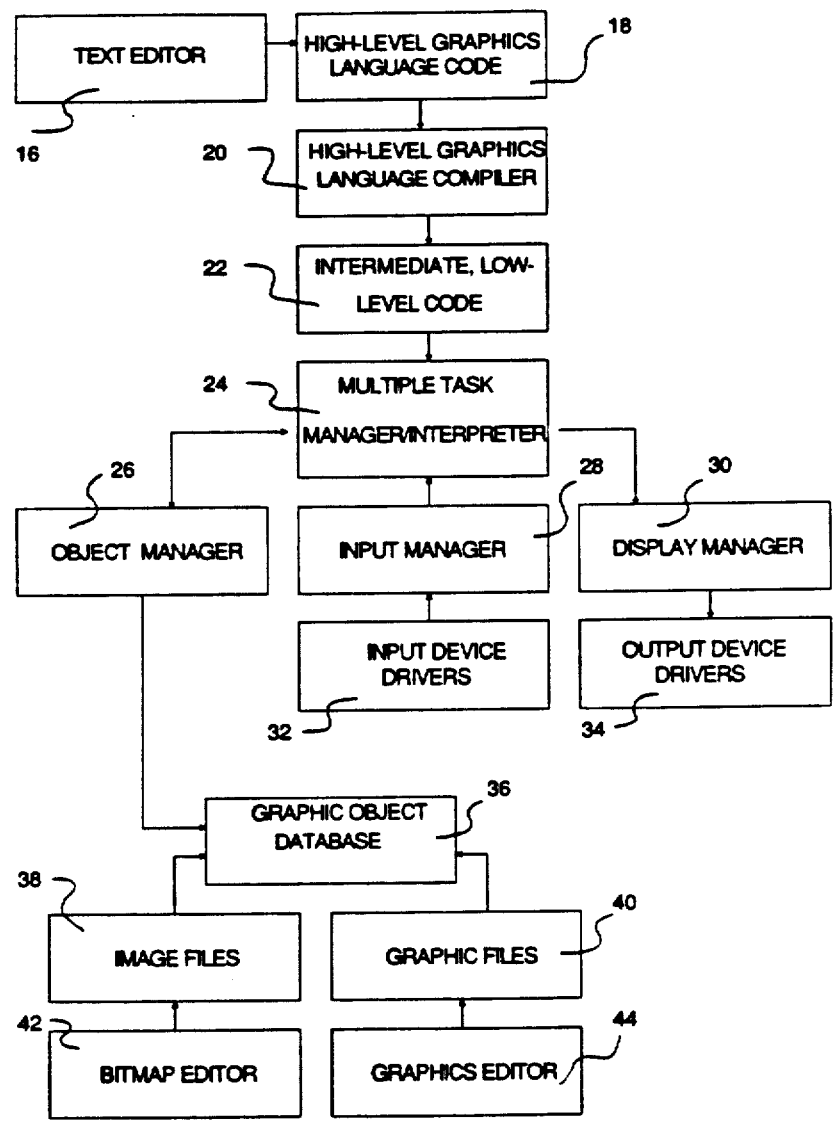
FIG. 2 is a schematic block diagram showing the software modules employed in practicing the method of the invention.

FIG. 2 is a schematic block diagram showing the software modules employed in practicing the present invention. Initially, a standard text editor 16, such as EDT Editor* (*registered trademark of Digital Equipment Corporation), is used to create the high-level graphics language source code 18, needed to execute the prototype. Once code is created, it is sent through the high-level graphics language compiler 20, and the code is debugged if necessary (not shown). Microfiche Appendix II lists a compiler written in C for use on the Vax computer to compile the high-level graphics language.

The compiler 20 transforms the high-level graphics language program into the intermediate, low-level code 22, needed to execute the prototype. The compiler 20 first divides the high-level graphics language program into tokens of the language, such as numbers, commas, variables, and test strings. These tokens are then used to drive a parser portion of the compiler (not shown). The parser interprets the tokenized code, generates the intermediate low-level code, and writes it out to an intermediate code file (not shown).

The compiler uses two standard UNIX tools: LEX (to tokenize, or perform the lexical analysis and manipulate the symbol tables) and YACC (to provide the grammer of the high-level graphics language and the necessary semantic actions). For a complete description of the compiler tools LEX and YACC, refer to Principles of Compiler Design by A. Aho and J. Ullman, 1977, Bell Laboratories, ISBN -0-201-00022-9.

The resulting intermediate, low-level source code 22, is run to execute the prototype. A complete code specification for the intermediate low-level code is shown in Appendix C.

The process described thus far depicts a typical development environment. To execute the prototype in a runtime environment, the system employs a multiple task manager/interpreter 24. This manager/interpreter executes and coordinates all activity for the input and output devices and handles database access. A listing of computer code written in C for the Vax computer for implementing the manager/interpreter is contained in Microfiche Appendix III.

The manager/interpreter 20 is comprised of two parts: a scheduler and an interpreter. The scheduler keeps track of various tasks running at the same time in the multi-tasking environment of the prototyping system. When a task is begun, the scheduler reads in the intermediate code produced by the compiler during a process called "Readfile." If a program is currently being read, the scheduler stacks the new task code to be read later.

If more than one task is running at a time, the scheduler cycles through each active task by executing one line of code from each and passing the code to the interpreter. Depending upon the statement being executed, tasks can take several states as shown in table 8:

TABLE 8

| States | Meaning |
|---|---|
| NULL | No task running in this task slot. |
| ACTIVE | Normal running state of a task. |
| W_STOP | Task is halted. |
| W_INPUT | Task is waiting for input and is not the selected task. |
| W_SLEEP | Task is in sleep state and will come out of this state temporarily if a "whenever" condition is tripped. At the end of the "whenever" condition, the system will return to the sleep state unless a "wakeup" has been done. |
| W_FILE | Task is waiting for one or more objects to be saved or retrieved to a filename .sav file. |
| W_INPUT | Task has issued an input request to the input manager and is waiting for the request to be satisfied. |
| W_PROC | Task is waiting for intermediate code to be loaded and begin running. |
| W_RET_SAV | Task is waiting to retrieve or save while another task is retrieving or saving. |
| W_GROUP | Task is doing a group on an area and is waiting for the object names that comprise the group to be sent back from the display manager. |
| W_STOP_W_INPUT | Task was halted while waiting for input. |
| W_WAIT | Task is waiting for a specified amount of time. |
| W_PARAMETER | Task has requested the parameter value of an object through the assign statement and is waiting for the value to be sent from the display manager. |
| DONE | Task is completed and marked for deletion. |

Between active task cycles, the scheduler also handles incoming mail from two mailboxes. High priority mail in the hpidptotp mailbox consists of special key handling; low priority mail in the lpidp totp mailbox consists of information sent from the input manager in response to requests from the task manager.

The scheduler buffers low priority mail for use by the interpreter and changes task states accordingly. In general, all of the W<states> listed above are waiting for low priority mail. When it is received, the task state is set to ACTIVE and the program counter is reset to the command that caused the W<state>. This is done because these types of statements are processed in two parts: the first time they are interpreted, an information request is made, and the second time they are interpreted, information returned and buffered by the scheduler is processed.

High priority mail comes from the input manager 28 and handles soft-key user input. The scheduler checks the high priority mailbox and completes all soft-key requests in the mailbox before continuing. Soft-key requests are listed in Table 9:

TABLE 9

| Soft-Key | Response |
|---|---|
| B _ BEGIN | Scheduler finds a free task slot and requests the name of the program to run there. |
| S _ SWITCH | Scheduler changes the selected task to the task that was begun after the one being changed. |
| D _ DELETE | Scheduler deletes the selected task and switches to the next task in the cycle. |
| H _ HALT | Scheduler halts further execution of the selected task's program. The task may be continued with a C from the user. |
| C _ CONTINUE | Scheduler resumes execution of the selected task after stopping after a HALT. |
| R _ RERUN | Scheduler repeats the entire selected task. |
| Q _ QUIT | Scheduler instructs the input manager and object manager to exit, waits for them to do so, and exits itself. |

The interpreter receives one line of code at a time from the scheduler and determines if it is a control statement or a reserved word statement. Control statements are handled only by the interpreter. Reserved work statements are sent to object manager 26, for execution. In addition, appropriate variables are updated by the task manager. The display manager 30 implements the linkage between a graphic object and a type of behavior. Though the high-level graphics code is written to describe a linkage between an object and its behavior, the actual process occurs in the display manager as intermediate code is executed. This linkage allows programmers to reposition graphic objects on the screen and have the object's behavior accompany the object. A program for implementing the object manager 26, written in C for the Vax computer is included in Microfiche Appendix IV.

The display and input managers are structured as separate system elements; however, they are implemented as a single element. A program for implementing the input manager 28, and the display manager 30, written in C for the Vax computer is included in Microfiche Appendix V.

To handle user input, the system receives input from standard input device drivers 32, which may be connected to a mouse, keyboard, digitizer puck, or digitizer pen. This information is passed to the input manager 28, and then to the multiple task manager/interpreter 24, for processing. To send data to users, the multiple task manager/interpreter 24, passes information to the display manager 30, and on to standard output device drivers 34. The output device drivers are typically connected to a monitor or printing device (not shown in FIG. 2).

The graphic objects data base 36 is accessed by one of two editors. A standard bitmap editor 42, is used to create image files 38, for small, detailed images such as icons or foreign language characters. A graphics editor 44 is used to create graphic files 40, such as large screen displays. A program for implementing graphics editor 44, written in the high-level graphics language of the present invention, is included as Microfilm Appendix VI. Both types of objects generated by bit map editor 42 and graphics editor 44 are stored as graphic objects in the database 36, and are treated as objects by the object manager 26. Complete data structures for specifying graphic objects are listed in Appendix B.

Figure 3:
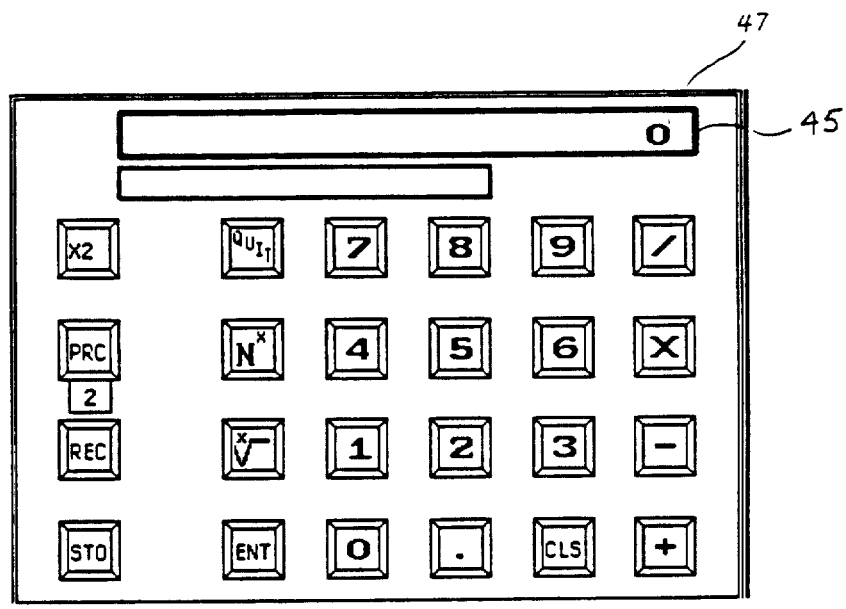
FIG. 3 is computer screen display of a prototype interface generated according by the method of the invention.

FIG. 3 shows the display screen of a prototype interface that was produced using this invention. This figure depicts a calculator prototype with graphics (boxes) 45 and text (numbers and letters) 47 on the same screen. The high-level graphics code used to create this prototype is listed in Appendix D.

Figure 4:
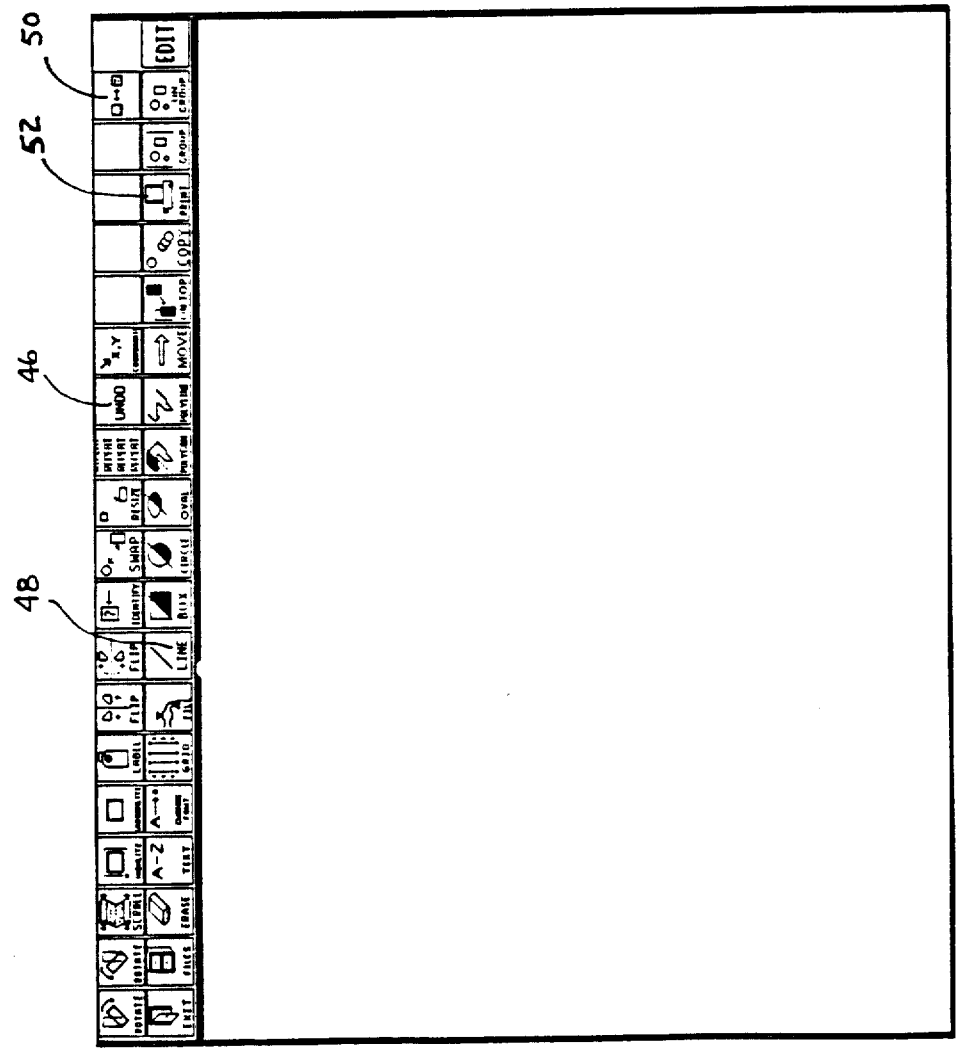
FIG. 4 is a computer screen display of another prototype generated by the method of the present invention.

FIG. 4 shows the display screen of another type of prototype interface that was produced using this invention. This figure displays the interface with the graphics editor 44 used to create graphics in the system. Text (names) 46,48 and graphics (icons)50, 52 are integrated on the same screen, and windows are available for data manipulation. The high-level graphics code used to create the graphics editor 44 and including code to implement this interface is included in Microfiche Appendix VI.

Figure 5:
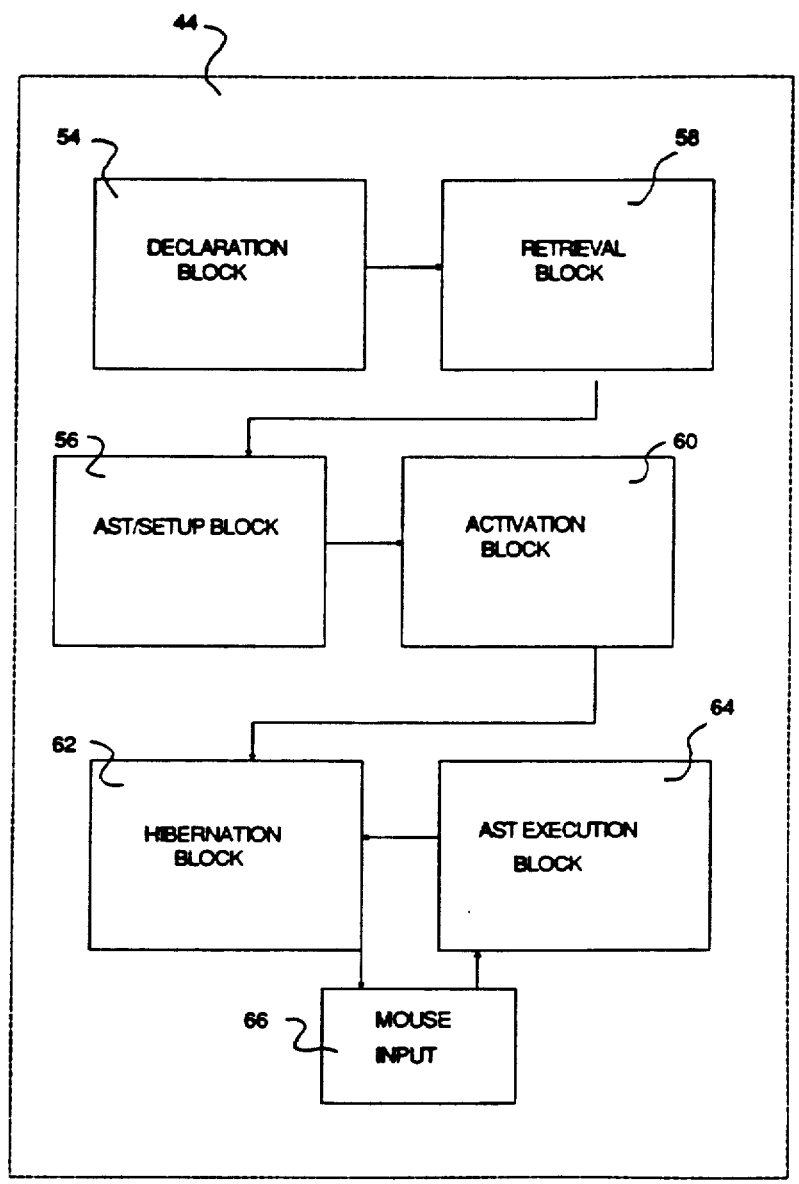
FIG. 5 is a schematic block diagram of a display manager employed to practice one aspect of the present invention.

Referring to FIG. 5, the graphics editor 44 consists of four primary blocks: a declaration block 54, where all variables are declared and set to specified or default values: a retrieval block 58, where stored graphic objects are retrieved and positioned for display on the screen; an AST asynchronous event) definition or setup block 56, where the behaviors of objects are described and linked to objects; an activation block 60, where the behaviors or actions are started; a hibernation block 62, where the interface prototype is put into a sleep state while awaiting the occurrence of a defined event to wake up and execute the action; and an AST Execution block 64. When the system is "hybernating", and a user actuates a mouse 66, the condition names in the AST/-Setup block 56 is executed by the AST Execution block 64. The system then "hybernates" until further user input is received.

The graphics editor in this invention allows programmers to "swap" the positions of graphic icons at the top of the display. Not only do the positions of the icons change, but all functionality associated with the icon goes with it. In FIG. 4, to swap the positions of the UNDO icon, 46, and the LINE icon, 48, a programmer simply clicks the mouse button over the "SWITCH" icon, 50, and then clicks once on each of the icons to be swapped. A listing of high-level graphics language code, demonstrating how this is done is included in Appendix E.

Advantages

This invention significantly reduces the time and effort required to produce a protoype because all of the programming can be done in the high-level graphics language used to execute the prototype. Prior systems required programmers to move between high- and low-level programming languages or other prototyping tools to execute such routine functions as asynchronous event handling.

This invention also accesses a central graphic object database that contains both bitmap and graphic object files with unique characteristics. Instead of treating these object types differently, depending upon the characteristics associated with them, this invention treats them all as "objects," resulting in both simplified program execution and extended functionality.

The high-level graphics language is also powerful enough so that prototype interfaces can be dynamically changed during runtime. Graphic objects and the behavior associated with them can be described by the high-level graphics language of the invention. Behaviors are physically linked to the data structure of a graphic object when the intermediate code is interpreted by the display manager. For example, the graphics editor used in this invention is written in the high-level graphics language. As programmers create graphics with the graphics editor, they can change the characteristics and behavior of the graphics editor itself without leaving the runtime environment of the graphics editor. This increases the speed at which graphics can be produced because interface modifications can be made as the editor is running.

The high-level graphics language used to execute a prototype also surpasses prior systems by linking asynchronous events with a specific screen item and storing them as one object, regardless of the item's X and Y position on the screen allowing the item's position to be changed without redefining a new X and Y location for the asynchronous event.

APPENDIX A

Copyright Eastman Kodak Company 1988
Drawing a Line Interactively Implemented in the High Level Graphics Language

```
Open a window named work_area with screen_height 400 screen_width 400.

Setup a condition named First_Point_Of_line such that whenever the button
        button_1 is clicked within the selected window then:
    Get the cursor location into x1_coordinate,y1_coordinate.
    Stop the condition named First_Point_Of_Line.
    Start the condition named Second_Point_Of_Line.
Endsetup.

Setup a condition named Second_Point_Of_line such that whenever the button
        button_1 is clicked within the selected window then:
    Get the cursor location into x2_coordinate,y2_coordinate.
    Draw a line line_1 at location x1_coordinate,y1_coordinate with
                     endpoint x2_coordinate,y2_coordinate.
    Stop the condition named Second_Point_Of_Line.
    Start the condition named First_Point_Of_Line.
Endsetup.
```
****************************************************************************

APPENDIX B

Copyright Eastman Kodak Company 1988

Data Structure of the Graphic Object
_____

. Fields Unique to Specific Object Types
    .. Field 1
        .
        .
        .
    .. Field n
. Fields Common to All Objects
    .. Object Identification
    .. Object Type
    .. Physical Size in Bytes
    .. Type of Lines
    .. Width of Lines
    .. Object Color
    .. Object Color Intensity
    .. Highlight Indicator
    .. Modification Lock Indicator
    .. Location X Coordinate
    .. Location Y Coordinate
    .. Lower Left X Coordinate of Screen Extent of Object
    .. Lower Left Y Coordinate of Screen Extent of Object
    .. Upper Right X Coordinate of Screen Extent of Object
    .. Upper Right Y Coordinate of Screen Extent of Object
    .. Center X Coordinate of Object
    .. Center Y Coordinate of Object
    .. Pointer to the Header of a list of Objects that are Grouped as
            This Object
    .. Pointer to the next Object Node
    .. Pointer to the last Object Node Data Structure of the AST
_____

. Status of AST Indicator
. AST Identification
. Type of Sounds
. Object Identification (* This ties the AST to the Object)
. Lower Left X Coordinate of Screen Extent of Object
. Lower Left Y Coordinate of Screen Extent of Object
. Upper Right X Coordinate of Screen Extent of Object
. Upper Right Y Coordinate of Screen Extent of Object
. Pointer to the AST Parameter Block
. Pointer to Node for Entry ASTs
. Pointer to Previous AST Node
. Pointer to Next AST Node Data Structure of the AST Parameter Block
_____

. Type of AST Request Indicator
. Window Identification
. Virtual Display Identification
. Keyboard Identification
. Ast Identification . Window Name String
. Maximum String Length for This Input
. String Input Echo Indicator
. Special Action Key Code
. Valid Button Number
. Type of Button Action
. Timer Interval Data Structure of Image Type Object
_____

. Image Unique Fields
    .. Number of Blocks of 8 bits in the Array
    .. Array of Blocks
    .. Image Raster Width
    .. Image Raster Height
    .. Number of Bits per Pixel . Fields Common to All Objects
    .. Field 1
          .
          .
          .
    .. Field n

APPENDIX_C

Copyright Eastman Kodak Company 1988

2 ICODE
ICODE FORM:

ASSIGN <variable_name> (operation_type)
    ------------------------------------------ followed by one of the following:

SUBSTRING)       <object_1> <p1> <c1>.
                                     ---------------------

JOINING)         <object_1> <object_2>.
                                     ----------------------

POSITION)        <object_1> <object_2>.
                                     ----------------------

LENGTH)          <object_1>.
                                     -----------

PARAM        {parameter} <object_1>.
                                     -----------------------

2 ICODE
ICODE FORM:

BEGIN <procedure_name>      (** not used by the interpreter)
    ----------------------

2 ICODE
ICODE FORM:

GOTO label
    ----------

2 ICODE
ICODE FORM:

CHANGE WINDOW_NAME <window_name>
    ------

2 ICODE
ICODE FORM:

CLEAR <object_name>
    -------------------

CLEAR_MENU <menu_name>
    ----------------------

2 ICODE
ICODE FORM:

CLONE <object_1> <object_2>  LOCATION <x1> <x2>
    -----------------------------

2 ICODE

ICODE FORM:

CLOSE WINDOW_NAME <window_name>
    -----

2 ICODE
ICODE FORM:

COPY <object_1> <object_2>  LOCATION <x1> <x2>
    --------------------------

2 ICODE
ICODE FORM:

CREATE {obj_type} <obj_name>  . . . {appropriatly from following}
    ----------------------------
                                        RADIUS <r1>
                                        START_DEGREE <s1>
                                        STOP_DEGREE <s2>
                                        WIDTH <w1>
                                        HEIGHT <h1>
                                        LENGTH <l1>
                                        ANGLE <a1>
                                        ENDPOINT <e1>,<e2>
                                        X_RADIUS <m1>
                                        Y_RADIUS <m2>
            (counting by pairs of pts)  POINTS <number_points>  <pt1>,<pt2>,.....
                                        LINESTYLE <y1>
                                        LINEWIDTH <z1>
                                        PATTERN <p1>
                                        COLOR <c1>
                                        RECTWIDTH <rw>
                                        RECTHEIGHT <rh>
                                        ALIGNMENT <a1>
                                        SPACING <s1>
                                        TEXTSTYLE <t1>
                                        VALUE <v1>
                                        LOCK <l>

```
              SETUP MENU <menu_name> <#choices> <choice_list>
              ---------------------------------------------------
                                           CHOICE_DESC <choice_desc_list>
                                           TITLE <menu_title>
                                           BORDER <menu_border>
                                           SLIDE_OFF <flag>
                                           EXIT_BUTTON <flag>
                                           FIRST_SELECT <flag>
                                           ON_RELEASE <flag>

2 REQ_PARAMS
REQUIRED PARAMETER DEFINITIONS:

parameters              valid types
      ----------              ----------- obj_type                types - arc box chord circle image line
                                      oval pie point polygon polyline
                                      text obj_name                string
                              variable menu_name               string
                              string variable
                              string array element choice_str              string
                              string variable
                              string array element

2 OP_PARAMS
OPTIONAL PARAMETER DEFINITIONS:

parameters              valid types
      ----------              ----------- r1                      number
                              variable
                              simple expression s?                      number
                              variable
                              simple expression w1                      number
                              variable
                              simple expression l1                      number
                              variable
                              simple expression a1                      number
                              variable
                              simple expression e?                      number
                              variable
                              simple expression m?                      number
                              variable
                              simple expression
```

| | |
|---|---|
| pt? | number<br>variable<br>simple expression |
| x? | number<br>variable<br>simple expression |
| y1 | number<br>variable<br>special word - dashed solid dotted<br>simple expression |
| z1 | number<br>variable<br>special word - extra_bold,bold,normal,fine,<br>    extra_fine<br>simple expression |
| p1 | number<br>variable<br><br>special word - checked,cross_hatch,striped<br>simple expression |
| c1 | number<br>variable<br>special word - red green blue yellow black white<br>simple expression |
| rw | number<br>variable<br>simple expression |
| rh | number<br>variable<br>simple expression |
| l | special word - locked, unlocked |
| f1 | special word - systemfont, bold_systemfont,<br>    wide_12_point,bold_wide_12_point<br>string variable<br>string |
| v1 | string<br>variable |
| choice_desc | string<br>string variable<br>string array element |
| menu_title | string<br>string variable<br>string array element |
| border_type | reserved word: PLAIN, SHADOW |
| slide_off | reserved word: ON, OFF<br>numeric variable<br>numeric array element |
| exit_button | reserved word: ON, OFF<br>numeric variable<br>numeric array element |

```
        first_select              reserved word: ON, OFF
                                  numeric variable
                                  numeric array element on_release                reserved word: ON, OFF
                                  numeric variable
                                  numeric array element

2 DEFAULTS
DEFAULTS:

D_LINESTYLE:  solid
   D_LINEWIDTH:  normal (1 pixel)
   D_PATTERN:    checked
   D_COLOR:      white
   D_CREATE_LOCATION_X: 0
   D_CREATE_LOCATION_Y: 0
   D_HEIGHT:     100
   D_WIDTH:      100
   D_POLYGON_POINTS: 3
   D_POLYGON_X1: 0
   D_POLYGON_Y1: 100
   D_POLYGON_X2: 100
   D_POLYGON_Y2: 0
   D_POLYLINE_POINTS: 2
   D_POLYLINE_X1: 100
   D_POLYLINE_Y1: 100
   D_X_RADIUS:   100
   D_Y_RADIUS:   50
   D_LINE_LENGTH: 100
   D_ANGLE:      45 (degrees)
   D_ENDPOINT_X: 10
   D_ENDPOINT_Y: 100
   D_RADIUS:     100
   D_START_DEG:  0
   D_STOP_DEG:   90
   D_FONT:       systemfont
   D_STRING_LENGTH: 132
   D_LOCK:       0 (unlocked)
   D_ALIGNMENT:  2 (left adjusted)
   D_TEXT_HEIGHT: 20 (actually controlled by font)
   D_SPACING:    5
   D_TEXTSTYLE:  1 (none)
   border_type   PLAIN
   slide-off     ON
   exit_button   OFF
   first_select  ON
   on_release    OFF

2 ERROR_HANDLING
ERROR HANDLING:

2 MAIL_PARAMS
MAIL COMMUNICATION:

INTERPRETER -> DISPLAY PROCESSOR mailbox_name:  lp_tp_to_idp mail:
```

3 ARC_MAIL
```
          ARC
                    value     type     meaning
                    -----     ----     -------
                    CREATE    int      create an object in the spirit list
                    s         str      spirit list id
                    ARC       int      object type is arc
                    on        str      name of arc
                    l         int      lock state
                    vs        int      version of dimensions ( 1 = vs1 , 2 = vs2)
default - [vs1:     r         flt      radius
                    s1        flt      start degree
                    s2        flt      stop degree                               ]
          [vs2:     pt1       flt      2cnd x point in three point definition
                    pt2       flt      2cnd y point in three point definition
                    pt3       flt      3rd  x point in three point definition
                    pt4       flt      3rd  y point in three point definition ]
                    ls        int      line style
                    lw        flt      linewidth of arc line
                    c         flt      color of arc line
                    lx        flt      x location
                    ly        flt      y location
```

3 BOX_MAIL
```
          BOX
                    value     type     meaning
                    -----     ----     -------
                    CREATE    int      create an object in the spirit list
                    s         str      spirit list id
                    BOX       int      object type is box
                    on        str      name of object
                    l         int      lock state
                    wd        flt      width of box
                    ht        flt      height of box
                    ls        int      line style
                    lw        flt      linewidth of box line
                    fi        int      fill indicator
                    p         int      pattern box is filled with
                    c         flt      color of box line
                    lx        flt      x location
                    ly        flt      y location
```

3 CHORD_MAIL
```
          CHORD
                    value     type     meaning
                    -----     ----     -------
                    CREATE    int      create an object in the spirit list
                    s         str      spirit list id
                    CHORD     int      object type is chord
                    on        str      name of chord
                    l         int      lock state
                    vs        int      version of dimensions ( 1 = vs1 , 2 = vs2)
default - [vs1:     r         flt      radius
                    s1        flt      start degree
                    s2        flt      stop degree                               ]
          [vs2:     pt1       flt      2cnd x point in three point definition
                    pt2       flt      2cnd y point in three point definition
                    pt3       flt      3rd  x point in three point definition
                    pt4       flt      3rd  y point in three point definition ]
                    ls        int      line style
                    lw        flt      linewidth of chord line
                    fi        int      fill indicator
                    p         int      pattern
                    c         flt      color of chord line
                    lx        flt      x location
                    ly        flt      y location
```

3 CIRCLE_MAIL
    CIRCLE

|  |  | value | type | meaning |
|---|---|---|---|---|
|  |  | CREATE | int | create an object in the spirit list |
|  |  | s | str | spirit list id |
|  |  | CIRCLE | int | object type is circle |
|  |  | on | str | name of object |
|  |  | l | int | lock state |
|  |  | vs | int | version of dimensions ( 1 = vs1 , 2 = vs2) |
| default - | {vs1: | r | flt | radius ] |
|  | [vs2: | pt1 | flt | 2cnd x point in three point definition |
|  |  | pt2 | flt | 2cnd y point in three point definition |
|  |  | pt3 | flt | 3rd x point in three point definition |
|  |  | pt4 | flt | 3rd y point in three point definition ] |
|  |  | ls | int | line style |
|  |  | lw | flt | linewidth of circle line |
|  |  | fi | int | fill indicator |
|  |  | p | int | pattern |
|  |  | c | flt | color |
|  |  | lx | flt | x location |
|  |  | ly | flt | y location |

3 IMAGE_MAIL
    IMAGE   (deferred)

3 LINE_MAIL
    LINE

|  |  | value | type | meaning |
|---|---|---|---|---|
|  |  | CREATE | int | create an object in the spirit list |
|  |  | s | str | spirit list id |
|  |  | LINE | int | create an object of type line |
|  |  | on | str | name of object |
|  |  | l | int | lock state |
|  |  | vs | int | version of dimensions (1=vs1 , 2=vs2) |
| default- | vs1: | l | flt | length of the line |
|  |  | a | flt | angle of the line |
|  | vs2: | x | flt | x endpoint position |
|  |  | y | flt | y endpoint position |
|  |  | ls | int | line style |
|  |  | lw | flt | linewidth of the line |
|  |  | c | flt | color of the line |
|  |  | lx | flt | x location |
|  |  | ly | flt | y location |

3 OVAL
    OVAL

| value | type | meaning |
|---|---|---|
| CREATE | int | create an object in the spirit list |
| s | str | spirit list id |
| OVAL | int | object of type oval |
| on | str | name of object |
| l | int | lock state |
| m1 | flt | x radius of oval |
| m2 | flt | y radius of oval |
| ls | int | linestyle |
| lw | flt | linewidth of oval line |
| fi | int | fill indicator |
| p | int | pattern inside oval |
| c | flt | color of oval line |
| lx | flt | x location |
| ly | flt | y location |

3 PIE_MAIL
    PIE

```
                     value    type    meaning
                     -----    ----    -------
                     CREATE   int     create an object in the spirit list
                       s      str     spirit list id
                     PIE      int     object type is pie
                       on     str     name of pie
                       l      int     lock state
                       vs     int     version of dimensions ( 1 = vs1 , 2 = vs2)
default -   [vs1:      r      flt     radius
                       s1     flt     start degree
                       s2     flt     stop degree                               ]
            [vs2:     pt1     flt     2cnd x point in three point definition
                      pt2     flt     2cnd y point in three point definition
                      pt3     flt     3rd  x point in three point definition
                      pt4     flt     3rd  y point in three point definition   ]
                       ls     int     line style
                       lw     flt     linewidth of pie line
                       fi     int     fill indicator
                       p      int     pattern
                       c      flt     color of pie line
                       lx     flt     x location
                       ly     flt     y location
```

3 POINT_MAIL
    POINT

```
                     value    type    meaning
                     -----    ----    -------
                     CREATE   int     create an object in the spirit list
                       s      str     spirit list id
                     POINT    int     object of type point
                       on     str     name of object
                       l      int     lock state
                       c      flt     color of point
                       lx     flt     x location of
                       ly     flt     y location
```

3 POLYGON_MAIL
    POLYGON

```
                     value    type    meaning
                     -----    ----    -------
                     CREATE   int     create an object in the spirit list
                       s      str     spirit list id
                     POLYGON  int     object of type polygon
                       on     str     name of object
                       l      int     lock state
                       ls     int     linestyle
                       lw     flt     linewidth of polygon line
                       fi     int     fill indicator
                       p      int     pattern inside polygon
                       c      flt     color of polygon line
                       lx     flt     x location  (starting point)
                       ly     flt     y location  (starting point)
                       np     int     number of points that make up the polygon
                       x1     flt     x point1
                       y1     flt     y point 1
                        .      .
                       xn     flt     last x point
                       yn     flt     last y point
```

3 POLYLINE_MAIL
    POLYLINE

```
                     value    type    meaning
                     -----    ----    -------
                     CREATE   int     create an object in the spirit list
                       s      str     spirit list id
                     POLYLINE int     object of type polyline
                       on     str     name of object
```

```
              l       int    lock state
              ls      int    linestyle
              lw      flt    linewidth of polyline line
              c       flt    color of polyline line
              lx      flt    location (starting point)
              ly      flt    location (starting point)
              np      int    number of points that make up the polyline
              x1      flt    x point1
              y1      flt    y point 1
              .       .      .
              xn      flt    last x point
              yn      flt    last y point
3 TEXT_MAIL
        TEXT
              value   type   meaning
              -----   ----   -------
              CREATE  int    create on object in the spirit world
              s       str    spirit list id
              STRING  int    object of type text
              on      str    object name
              l       int    lock state
              al      int    alignment
              f       str    font
              ht      flt    height
              sf      flt    space factor
              ts      int    textstyle
              c       flt    color
              lx      flt    location x
              ly      flt    location y
              #e      int    #elements
              e1      str    string of first element
              .       .      .
              .       .      .
              en      str    string of the last element
```

2 ICODE
ICODE FORM:

```
    DECLARE {variable_type} <variable_1> ELEMENTS <e1> INIT_VALUE <i1>
    ------------------------------------
```

2 ICODE
ICODE FORM:

```
    DELETE <object_name>
    --------------------
```

2 ICODE
ICODE FORM:

```
    DISPLAY <object_name>  LOCATION <x1><x2>
    ----------------------
```

2 ICODE
ICODE FORM:

```
    DO GOTO <label>
    ---------------
```

2 REQ_PARAMS
REQUIRED PARAMETER DEFINITIONS:

```
    parameters              valid types
    ----------              ----------- procedure_name          string
                            variable
```

2 OP_PARAMS
OPTIONAL PARAMETER DEFINITIONS:

parameters                    valid types
    ----------                    -----------

** none

2 DEFAULTS
DEFAULTS:

None.

2 ERROR_HANDLING
ERROR HANDLING:

2 MAIL_PARAMS
MAIL COMMUNICATION:

** none

2 CONCERNS
CONCERNS:

2 ICODE
ICODE FORM:

DRAW {obj_type} <obj_name> . . . (appropriatly from following)
    ---------------------------
                                          RADIUS <r1>
                                          START_DEGREE <s1>
                                          STOP_DEGREE <s2>
                                          WIDTH <w1>
                                          HEIGHT <h1>
                                          LENGTH <l1>
                                          ANGLE <a1>
                                          ENDPOINT <e1>,<e2>
                                          X_RADIUS <m1>
                                          Y_RADIUS <m2>
                                          POINTS number_points <pt1>,<pt2>,.....
                                          LINESTYLE <y1>
                                          LINEWIDTH <z1>
                                          PATTERN <p1>
                                          COLOR <c1>
                                          RECTWIDTH <rw>
                                          RECTHEIGHT <rh>
                                          ALIGNMENT <a1>
                                          SPACING <s1>
                                          FONT    <f1>
                                          TEXTSTYLE <t1>
                                          VALUE <v1>
                                          LOCK <l>

ICODE FORM:

END???
    ------
        procedure
        main
        if
        while
        setup

```
2 ICODE
ICODE FORM:

FILL <object_name> PATTERN <pattern_name>
    -------------------

2 ICODE
ICODE FORM:

FLIP <object_name> ORIENTATION <orientation>
    -------------------

2 ICODE
ICODE FORM:

GET CURSOR <X1> <X2>  BUTTON <button_name>
    ---------------------
                              -----------
                          |   AREA_TYPE <a1> <a2> <w> <h>
      optionally one      |
         of these          |   OBJECT_TYPE <object_name>
                          |
                          |   WINDOW_TYPE
                              -----------

GET STRING  <string_buf> LENGTH <length> ECHO <echo>
    -------------------------
                                LOCATION <e1> <e2>  FONT <font>

GET FILE_DEVICE <unit> <file_name> <variable> START_POSITION <start>
    -----------------------------------------------

GET VOICE <voice_buf>  STARTING <start_str>  ENDING  <end_str>
    ---------------------

2 ICODE
ICODE FORM:

GROUP <group_name> <obj#> <object_1> . . .
    -----------------------------------

2 ICODE
ICODE FORM:

HIGHLIGHT <object_name>
    -----------------------

2 ICODE
ICODE FORM:

IDENTIFY <variable_1> LOCATION <x1> <x2>
    -----------------------

2 ICODE
ICODE FORM:

if <condition> -->    IF <!condition> GOTO <label>
                      ---------------------------- otherwise --> GOTO <label>

2 ICODE
ICODE FORM:

MODIFY <object_name> <parm#> PARM <parm_val(s)> . . .
   --------------------------------------------------------
```

2 ICODE
ICODE FORM:

MOVE <object_name> METHOD <m1> LOCATION <x1><x2>
    --------------------

2 ICODE
ICODE FORM:

OPEN <window_name> PARM  <parm_val(s)> . . .
    --------------------

2 ICODE
ICODE FORM:

POP  <menu_name> <v1> LOCATION <x1> <x2>
    ----------------------

2 ICODE
ICODE FORM:

PUT FILE_DEVICE <var_obj_name> <file_name>
    ------------------------------------------
    PUT CURSOR LOCATION <x1> <x2>
    ----------

2 ICODE
ICODE FORM:

RESIZE <object_name> FACTOR <factor> DIRECTION <rd> MAGNIFICATION <rm>
    ----------------------

2 ICODE
ICODE FORM:

RETRIEVE <filename> <world_type>
    --------------------------------

2 ICODE
ICODE FORM:

ROTATE <object_name> FACTOR <factor> LOCATION <x1><x2>
    ---------------------

2 ICODE
ICODE FORM:

RUN  <command_line>  LOCATION <x1> <x2>
    ---------------------
                                EXIT_STATUS <exit> .
2 ICODE
ICODE FORM:

SAVE <object_name>
    ------------------

2 ICODE
ICODE FORM:

SCROLL  FACTOR <factor> DIRECTION <direction>
    -------

2 ICODE
ICODE FORM:

SET PARM <parm_val(s)> . . .
    --------------------------------

PARM stands for all the many codes that specify parameters

2 ICODE
ICODE FORM:

```
    SETUP WHENEVER <condition_name> CURSOR <curs_verb>
    ----------------------------------------------------
                                    AREA_TYPE <l1> <l2> <w> <h>
                              or    WINDOW_TYPE
                              or    OBJECT_TYPE <object_name>

SETUP WHENEVER <condition_name> KEY <key_name>
    ----------------------------------------------------

SETUP WHENEVER <condition_name> BUTTON <button_no> <button_verb>
    ----------------------------------------------------------------
                                    AREA_TYPE <l1> <l2> <w> <h>
                              or    WINDOW_TYPE
                              or    OBJECT_TYPE <object_name>

SETUP WHENEVER <condition_name> TIMER <time>
    ----------------------------------------------------

SETUP WHENEVER <condition_name> VOICE <voice verb>
    ----------------------------------------------------
```

2 ICODE
ICODE FORM:

```
    START <whenever_name>
    ---------------------
```

2 ICODE
ICODE FORM:

```
    STOP <whenever_name>
    ---------------------
```

2 ICODE
ICODE FORM:

```
    SWAP <object1><object2>
    -----------------------
```

2 ICODE
ICODE FORM:

```
    UNGROUP <group_name>
    --------------------
```

2 ICODE
ICODE FORM:

```
    UNHIGHLIGHT <object_name>
    -------------------------
```

2 ICODE
ICODE FORM:

```
    WAIT DURATION <duration>
    ----
```

2 ICODE
ICODE FORM:

```
    while <condition> -->   IF  <!condition> GOTO <label1>
                            ------------------------------
        endwhile --> GOTO <label2>
                    -------------
```

2 ICODE
ICODE FORM:

ZOOM FACTOR <factor> DIRECTION <dir>
    ----

2 ICODE
ICODE FORM:

ASSIGN <variable_name> {operation_type}
    ------------------------------------ followed by one of the following:

SUBSTRING)        <object_1> <p1> <c1>.
                                                                    --------------------

JOINING)         <object_1> <object_2>.
                                                                    ----------------------

POSITION)        <object_1> <object_2>.
                                                                    ----------------------

LENGTH)          <object_1>.
                                                                     -----------

PARAM        {parameter} <object_1>.
                                                                    --------------------------

2 ICODE
ICODE FORM:

BEGIN <procedure_name>      (** not used by the interpreter)
    ----------------------

2 ICODE
ICODE FORM:

GOTO label
    ----------

2 ICODE
ICODE FORM:

CHANGE WINDOW_NAME <window_name>
    ------

2 ICODE
ICODE FORM:

CLEAR <object_name>
    -------------------

CLEAR_MENU <menu_name>
    ----------------------

2 ICODE
ICODE FORM:

CLONE <object_1> <object_2>   LOCATION <x1> <x2>
    ------------------------------

2 ICODE
ICODE FORM:

CLOSE WINDOW_NAME <window_name>
    -----

2 ICODE
ICODE FORM:

COPY <object_1> <object_2>  LOCATION <x1> <x2>
    ------------------------------

2 ICODE
ICODE FORM:

CREATE {obj_type} <obj_name>  . . . {appropriatly from following}
    ------------------------------
```
                                        RADIUS <r1>
                                        START_DEGREE <s1>
                                        STOP_DEGREE <s2>
                                        WIDTH <w1>
                                        HEIGHT <h1>
                                        LENGTH <l1>
                                        ANGLE <a1>
                                        ENDPOINT <e1>,<e2>
                                        X_RADIUS <m1>
                                        Y_RADIUS <m2>
         (counting by pairs of pts)     POINTS <number_points>  <pt1>,<pt2>,.....
                                        LINESTYLE <y1>
                                        LINEWIDTH <z1>
                                        PATTERN <p1>
                                        COLOR <c1>
                                        RECTWIDTH <rw>
                                        RECTHEIGHT <rh>
                                        ALIGNMENT <a1>
                                        SPACING <s1>
                                        TEXTSTYLE <t1>
                                        VALUE <v1>
                                        LOCK <l>

SETUP MENU <menu_name> <#choices> <choice_list>
         ------------------------------------------------
                                        CHOICE_DESC <choice_desc_list>
                                        TITLE <menu_title>
                                        BORDER <menu_border>
                                        SLIDE_OFF <flag>
                                        EXIT_BUTTON <flag>
                                        FIRST_SELECT <flag>
                                        ON_RELEASE <flag>
```

2 REQ_PARAMS
REQUIRED PARAMETER DEFINITIONS:

parameters            valid types
    ----------            ----------- obj_type              types - arc box chord circle image line
                                 oval pie point polygon polyline
                                 text obj_name              string
                           variable menu_name             string
                           string variable
                           string array element choice_str            string
                           string variable
                           string array element

2 OP_PARAMS
OPTIONAL PARAMETER DEFINITIONS:

```
parameters              valid types
----------              ----------- r1                  number
                        variable
                        simple expression s?                  number
                        variable
                        simple expression w1                  number
                        variable
                        simple expression l1                  number
                        variable
                        simple expression a1                  number
                        variable
                        simple expression e?                  number
                        variable
                        simple expression
    m?                  number
                        variable
                        simple expression pt?                 number
                        variable
                        simple expression x?                  number
                        variable
                        simple expression y1                  number
                        variable
                        special word - dashed solid dotted
                        simple expression z1                  number
                        variable
                        special word - extra_bold,bold,normal,fine,
                                 extra_fine
                        simple expression p1                  number
                        variable
                        special word - checked,cross_hatch,striped
                        simple expression c1                  number
                        variable
                        special word - red green blue yellow black white
                        simple expression rw                  number
                        variable
                        simple expression
```

| | |
|---|---|
| rh | number<br>variable<br>simple expression |
| l | special word - locked, unlocked |
| fl | special word - systemfont, bold_systemfont,<br>       wide_12_point,bold_wide_12_point<br>string variable<br>string |
| vl | string<br>variable |
| choice_desc | string<br>string variable<br>string array element |
| menu_title | string<br>string variable<br>string array element |
| border_type | reserved word: PLAIN, SHADOW |
| slide_off | reserved word: ON, OFF<br>numeric variable<br>numeric array element |
| exit_button | reserved word: ON, OFF<br>numeric variable<br>numeric array element |
| first_select | reserved word: ON, OFF<br>numeric variable<br>numeric array element |
| on_release | reserved word: ON, OFF<br>numeric variable<br>numeric array element |

2 DEFAULTS
DEFAULTS:

```
D_LINESTYLE:   solid
D_LINEWIDTH:   normal (1 pixel)
D_PATTERN:     checked
D_COLOR:       white
D_CREATE_LOCATION_X: 0
D_CREATE_LOCATION_Y: 0
D_HEIGHT:      100
D_WIDTH:       100
D_POLYGON_POINTS:  3
D_POLYGON_X1:  0
D_POLYGON_Y1:  100
D_POLYGON_X2:  100
D_POLYGON_Y2:  0
D_POLYLINE_POINTS: 2
D_POLYLINE_X1: 100
D_POLYLINE_Y1: 100
D_X_RADIUS:    100
D_Y_RADIUS:    50
D_LINE_LENGTH: 100
D_ANGLE:       45 (degrees)
```

```
        D_ENDPOINT_X: 10
        D_ENDPOINT_Y: 100
        D_RADIUS:     100
        D_START_DEG:  0
        D_STOP_DEG:   90
        D_FONT:       systemfont
        D_STRING_LENGTH: 132
        D_LOCK:       0 (unlocked)
        D_ALIGNMENT:  2 (left adjusted)
        D_TEXT_HEIGHT: 20 (actually controlled by font)
        D_SPACING:    5
        D_TEXTSTYLE:  1 (none)
        border_type   PLAIN
        slide-off     ON
        exit_button   OFF
        first_select  ON
        on_release    OFF

2 ERROR_HANDLING
   ERROR HANDLING:

2 MAIL_PARAMS
   MAIL COMMUNICATION:

INTERPRETER -> DISPLAY PROCESSOR mailbox_name:  lp_tp_to_idp mail:

3 ARC_MAIL
             ARC
                      value     type     meaning
                      -----     ----     -------
                      CREATE    int      create an object in the spirit list
                        s       str      spirit list id
                      ARC       int      object type is arc
                      on        str      name of arc
                        1       int      lock state
                      vs        int      version of dimensions ( 1 = vs1 , 2 = vs2)
default - [vs1:         r       flt      radius
                       s1       flt      start degree
                       s2       flt      stop degree                              ]
          [vs2:        pt1      flt      2cnd x point in three point definition
                       pt2      flt      2cnd y point in three point definition
                       pt3      flt      3rd  x point in three point definition
                       pt4      flt      3rd  y point in three point definition ]
                       ls       int      line style
                       lw       flt      linewidth of arc line
                        c       flt      color of arc line
                       lx       flt      x location
                       ly       flt      y location 3 BOX_MAIL
             BOX
                      value     type     meaning
                      -----     ----     -------
                      CREATE    int      create an object in the spirit list
                         s      str      spirit list id
                      BOX       int      object type is box
                      on        str      name of object
                        1       int      lock state
                       wd       flt      width of box
                       ht       flt      height of box
```

```
                    ls      int     line style
                    lw      flt     linewidth of box line
                    fi      int     fill indicator
                    p       int     pattern box is filled with
                    c       flt     color of box line
                    lx      flt     x location
                    ly      flt     y location 3 CHORD_MAIL
        CHORD
                    value   type    meaning
                    -----   ----    -------
                    CREATE  int     create an object in the spirit list
                    s       str     spirit list id
                    CHORD   int     object type is chord
                    on      str     name of chord
                    l       int     lock state
                    vs      int     version of dimensions ( 1 = vs1 , 2 = vs2)
default - [vs1:     r       flt     radius
                    s1      flt     start degree
                    s2      flt     stop degree                                 ]
          [vs2:     pt1     flt     2cnd x point in three point definition
                    pt2     flt     2cnd y point in three point definition
                    pt3     flt     3rd  x point in three point definition
                    pt4     flt     3rd  y point in three point definition ]
                    ls      int     line style
                    lw      flt     linewidth of chord line
                    fi      int     fill indicator
                    p       int     pattern
                    c       flt     color of chord line
                    lx      flt     x location
                    ly      flt     y location 3 CIRCLE_MAIL
        CIRCLE
                    value   type    meaning
                    -----   ----    -------
                    CREATE  int     create an object in the spirit list
                    s       str     spirit list id
                    CIRCLE  int     object type is circle
                    on      str     name of object
                    l       int     lock state
                    vs      int     version of dimensions ( 1 = vs1 , 2 = vs2)
default - [vs1:     r       flt     radius                                      ]
          [vs2:     pt1     flt     2cnd x point in three point definition
                    pt2     flt     2cnd y point in three point definition
                    pt3     flt     3rd  x point in three point definition
                    pt4     flt     3rd  y point in three point definition ]
                    ls      int     line style
                    lw      flt     linewidth of circle line
                    fi      int     fill indicator
                    p       int     pattern
                    c       flt     color
                    lx      flt     x location
                    ly      flt     y location
3 IMAGE_MAIL
        IMAGE       (deferred)
3 LINE_MAIL
        LINE
                    value   type    meaning
                    -----   ----    -------
                    CREATE  int     create an object in the spirit list
                    s       str     spirit list id
                    LINE    int     create an object of type line
                    on      str     name of object
                    l       int     lock state
                    vs      int     version of dimensions (1=vs1 , 2=vs2)
```

```
default-           vs1:   l     flt   length of the line
                   a      flt   angle of the line vs2:    x      flt   x endpoint position
                   y      flt   y endpoint position ls     int   line style
                   lw     flt   linewidth of the line
                   c      flt   color of the line
                   lx     flt   x location
                   ly     flt   y location 3 OVAL
       OVAL
                   value  type  meaning
                   -----  ----  -------
                   CREATE int   create an object in the spirit list
                   s      str   spirit list id
                   OVAL   int   object of type oval
                   on     str   name of object
                   l      int   lock state
                   m1     flt   x radius of oval
                   m2     flt   y radius of oval
                   ls     int   linestyle
                   lw     flt   linewidth of oval line
                   fi     int   fill indicator
                   p      int   pattern inside oval
                   c      flt   color of oval line
                   lx     flt   x location
                   ly     flt   y location 3 PIE_MAIL
       PIE
                   value  type  meaning
                   -----  ----  -------
                   CREATE int   create an object in the spirit list
                   s      str   spirit list id
                   PIE    int   object type is pie
                   on     str   name of pie
                   l      int   lock state
                   vs     int   version of dimensions ( 1 = vs1 , 2 = vs2)
default - [vs1:    r      flt   radius
                   s1     flt   start degree
                   s2     flt   stop degree                                  ]
          [vs2:    pt1    flt   2cnd x point in three point definition
                   pt2    flt   2cnd y point in three point definition
                   pt3    flt   3rd  x point in three point definition
                   pt4    flt   3rd  y point in three point definition ]
                   ls     int   line style
                   lw     flt   linewidth of pie line
                   fi     int   fill indicator
                   p      int   pattern
                   c      flt   color of pie line
                   lx     flt   x location
                   ly     flt   y location 3 POINT_MAIL
       POINT
                   value  type  meaning
                   -----  ----  -------
                   CREATE int   create an object in the spirit list
                   s      str   spirit list id
                   POINT  int   object of type point
                   on     str   name of object
                   l      int   lock state
                   c      flt   color of point
                   lx     flt   x location of
                   ly     flt   y location
```

3 POLYGON_MAIL
    POLYGON

| value | type | meaning |
|-------|------|---------|
| CREATE | int | create an object in the spirit list |
| s | str | spirit list id |
| POLYGON | int | object of type polygon |
| on | str | name of object |
| l | int | lock state |
| ls | int | linestyle |
| lw | flt | linewidth of polygon line |
| fi | int | fill indicator |
| p | int | pattern inside polygon |
| c | flt | color of polygon line |
| lx | flt | x location  (starting point) |
| ly | flt | y location  (starting point) |
| np | int | number of points that make up the polygon |
| x1 | flt | x point1 |
| y1 | flt | y point 1 |
| . | . | . |
| xn | flt | last x point |
| yn | flt | last y point |

3 POLYLINE_MAIL
    POLYLINE

| value | type | meaning |
|-------|------|---------|
| CREATE | int | create an object in the spirit list |
| s | str | spirit list id |
| POLYLINE | int | object of type polyline |
| on | str | name of object |
| l | int | lock state |
| ls | int | linestyle |
| lw | flt | linewidth of polyline line |
| c | flt | color of polyline line |
| lx | flt | location (starting point) |
| ly | flt | location (starting point) |
| np | int | number of points that make up the polyline |
| x1 | flt | x point1 |
| y1 | flt | y point 1 |
| . | . | . |
| xn | flt | last x point |
| yn | flt | last y point |

3 TEXT_MAIL
    TEXT

| value | type | meaning |
|-------|------|---------|
| CREATE | int | create on object in the spirit world |
| s | str | spirit list id |
| STRING | int | object of type text |
| on | str | object name |
| l | int | lock state |
| al | int | alignment |
| f | str | font |
| ht | flt | height |
| sf | flt | space factor |
| ts | int | textstyle |
| c | flt | color |
| lx | flt | location x |
| ly | flt | location y |
| #e | int | #elements |
| e1 | str | string of first element |
| . | . | . |
| . | . | . |
| en | str | string of the last element |

2 ICODE
ICODE FORM:

DECLARE {variable_type} <variable_1> ELEMENTS <el> INIT_VALUE <il>
    -------------------------------------

2 ICODE
ICODE FORM:

DELETE <object_name>
    --------------------

2 ICODE
ICODE FORM:

DISPLAY <object_name>  LOCATION <x1><x2>
    ---------------------

2 ICODE
ICODE FORM:

DO GOTO <label>
    ---------------

2 REQ_PARAMS
REQUIRED PARAMETER DEFINITIONS:

| parameters | valid types |
|---|---|
| procedure_name | string<br>variable |

2 OP_PARAMS
OPTIONAL PARAMETER DEFINITIONS:

| parameters | valid types |
|---|---|

** none

2 DEFAULTS
DEFAULTS:

None.

2 ERROR_HANDLING
ERROR HANDLING:

2 MAIL_PARAMS
MAIL COMMUNICATION:

** none

2 CONCERNS
CONCERNS:

2 ICODE
ICODE FORM:

DRAW {obj_type} <obj_name> . . . {appropriatly from following}
    --------------------------

```
                              RADIUS <r1>
                              START_DEGREE <s1>
                              STOP_DEGREE <s2>
                              WIDTH <w1>
                              HEIGHT <h1>
                              LENGTH <l1>
                              ANGLE <a1>
                              ENDPOINT <e1>,<e2>
                              X_RADIUS <m1>
                              Y_RADIUS <m2>
                              POINTS number_points <pt1>,<pt2>,.....
                              LINESTYLE <y1>
                              LINEWIDTH <z1>
                              PATTERN <p1>
                              COLOR <c1>
                              RECTWIDTH <rw>
                              RECTHEIGHT <rh>
                              ALIGNMENT <a1>
                              SPACING <s1>
                              FONT    <f1>
                              TEXTSTYLE <t1>
                              VALUE <v1>
                              LOCK <l>

2 ICODE
ICODE FORM:
    END???
    ------
        procedure
        main
        if
        while
        setup 2 ICODE
ICODE FORM:
    FILL <object_name> PATTERN <pattern_name>
    --------------------

2 ICODE
ICODE FORM:
    FLIP <object_name> ORIENTATION <orientation>
    --------------------

2 ICODE
ICODE FORM:
    GET CURSOR <X1> <X2>   BUTTON <button_name>
    --------------------
                           -----------
                           |  AREA_TYPE <a1> <a2> <w> <h>
        optionally one     |
                           |  OBJECT_TYPE <object_name>
           of these        |
                           |  WINDOW_TYPE
                           -----------

GET STRING  <string_buf> LENGTH <length> ECHO <echo>
    --------------------
                           LOCATION <e1> <e2>  FONT <font>

GET FILE_DEVICE <unit> <file_name> <variable> START_POSITION <start>
    --------------------------------------------------

GET VOICE <voice_buf>  STARTING <start_str>  ENDING  <end_str>
    ----------------------
```

2 ICODE
ICODE FORM:

GROUP <group_name> <obj#> <object_1> . . .
      -----------------------------------

2 ICODE
ICODE FORM:

HIGHLIGHT <object_name>
      -----------------------

2 ICODE
ICODE FORM:

IDENTIFY <variable_1> LOCATION <x1> <x2>
      ----------------------

2 ICODE
ICODE FORM:

if <condition> -->    IF <!condition> GOTO <label>
                      ----------------------------- otherwise --> GOTO <label>

2 ICODE
ICODE FORM:

MODIFY <object_name> <parm#> PARM <parm_val(s)> . . .
    ---------------------------------------------------------

2 ICODE
ICODE FORM:

MOVE <object_name> METHOD <m1> LOCATION <x1><x2>
      --------------------

2 ICODE
ICODE FORM:

OPEN <window_name> PARM  <parm_val(s)> . . .
      --------------------

2 ICODE
ICODE FORM:

POP  <menu_name> <v1> LOCATION <x1> <x2>
      ----------------------

2 ICODE
ICODE FORM:

PUT FILE_DEVICE <var_obj_name> <file_name>
      ------------------------------------------
      PUT CURSOR LOCATION <x1> <x2>
      ----------

2 ICODE
ICODE FORM:

RESIZE <object_name> FACTOR <factor> DIRECTION <rd> MAGNIFICATION <rm>
      ----------------------

2 ICODE
ICODE FORM:

RETRIEVE <filename> <world_type>
    ---------------------------------

2 ICODE
ICODE FORM:

ROTATE <object_name> FACTOR <factor> LOCATION <x1><x2>
    ---------------------

2 ICODE
ICODE FORM:

RUN  <command_line>  LOCATION <x1> <x2>
    ---------------------
                                   EXIT_STATUS <exit> .

2 ICODE
ICODE FORM:

SAVE <object_name>
    -------------------

2 ICODE
ICODE FORM:

SCROLL  FACTOR <factor> DIRECTION <direction>
    --------

2 ICODE
ICODE FORM:

SET PARM <parm_val(s)> . . .
    ---------------------------------

PARM stands for all the many codes that specify parameters

2 ICODE
ICODE FORM:

SETUP WHENEVER <condition_name> CURSOR <curs_verb>
    ---------------------------------------------------
                                AREA_TYPE <l1> <l2> <w> <h>
                      or   WINDOW_TYPE
                      or   OBJECT_TYPE <object_name>

SETUP WHENEVER <condition_name> KEY <key_name>
    -----------------------------------------------

SETUP WHENEVER <condition_name> BUTTON <button_no> <button_verb>
    -----------------------------------------------------------------
                                AREA_TYPE <l1> <l2> <w> <h>
                      or    WINDOW_TYPE
                      or    OBJECT_TYPE <object_name>

SETUP WHENEVER <condition_name> TIMER <time>
    ----------------------------------------------

SETUP WHENEVER <condition_name> VOICE <voice verb>
    ----------------------------------------------------

2 ICODE
ICODE FORM:

START <whenever_name>
    ----------------------

2 ICODE
ICODE FORM:

STOP <whenever_name>
    --------------------

2 ICODE
ICODE FORM:

SWAP <object1><object2>
    -----------------------

2 ICODE
ICODE FORM:

UNGROUP <group_name>
    --------------------

2 ICODE
ICODE FORM:

UNHIGHLIGHT <object_name>
    -------------------------

2 ICODE
ICODE FORM:

WAIT DURATION <duration>
    ----

2 ICODE
ICODE FORM:

while <condition> --> IF <!condition> GOTO <label1>
                          -----------------------------
    endwhile --> GOTO <label2>
                 -------------

2 ICODE
ICODE FORM:

ZOOM FACTOR <factor> DIRECTION <dir>
    ----
/*       MMICONFIG.IN   --  SYSTEM DEFINED CONSTANTS       */

/*    INPUT PROCESSOR     */

/ General Constants /
define  LOCAL    1
define  GLOBAL   2
define  OK       1
define  FAIL     0
define  ERROR   (-1)
define  NONE    (-1)

/ ASCII Key Codes /
define  RETURN_KEY    13          /* string terminator: RETURN key */
define  ENTER_KEY    270          /* synonymous string terminator  */
define  DELETE_KEY   127

/ AST Status Codes /
define  SUSPENDED    0            /* ast state when just started and from STOP */
define  ACTIVATED    1            /* ast state when STARTED (can have been any
                                      prev state) */
define  READY        2            /* ast state after a change window (task)
                                      operation(from ACTIVE) */

```
#define DISABLED        3       /* ast state from ACTIVE when STOP ALL request
                                   */
#define MODIFIED        4       /* ast state from ACTIVE when object/window
                                   screen extent values have changed */
#define SYNC_SKIP       5       /* ast state from ACTIVE when MSENTERAST must
                                   not be restarted/executed when trapped */
#define NOTSYNC_SKIP    6       /* intermediate state after enter trips/before
                                   TP sends restart              */
#define X_READY         7       /* ast state after exit ast trips, before TP
                                   sends restart */
#define CLEARED_ACT     8       /* ast state from ACTIVE when object (assoc'd
                                   to AST) is 'cleared'; status is disablement */
#define CLEARED_RDY     9       /* ast state from READY  when object is cleared
                                   but window is not selected-current */
#define CLEARED_SS      10      /* ast state from NOTSYNC/SYNC_SKIP; ie,
                           clearing done within ast assoc'd to cleared obj   */
#define GROUPED_ACT     11
                                /* ast state from ACTIVE when object made part
                                   of group; status is disablement */
#define GROUPED_RDY     12      /* ast state from READY , eg when grping done
                                   within button ast assoc'd to grped object */
#define GROUPED_SS      13      /* ast state from NOTSYNC/SYNC_SKIP; ie,
                           grouping done within ast assoc'd to grouped obj   */
#define ZMSCL_ACT       14      /* ast state from ACTIVATED to UIS canceled
                                   during zoom/scroll operation */
#define ZMSCL_XRDY      15      /* ast state from X_READY (within cursor exit)
                                   to UIS canceled during zoom/scroll operation */
#define ZMSCL_RDY       16      /* ast state from READY (within button ast) to
                                   UIS canceled during zoom/scroll operation */
#define ZMSCL_SS        17      /* ast state from NOT/SYNC_SKIP (within cursor
                             enter);UIS canceled during zoom/scroll operation */
#define DISABLED_ACT    18      /* ast state from ACTIVATED to UIS canceled
                                   during a cursor modification to 'stretch' */
#define DISABLED_XRDY   19      /* ast state from X_READY to UIS canceled
                                   during a cursor modification to 'stretch' */
#define DISABLED_RDY    20      /* ast state from READY to UIS canceled
                                   during a cursor modification to 'stretch' */
#define DISABLED_SS     21      /* ast state from NOT/SYNC_SKIP to UIS
                               canceled during a cursor modification to 'stretch' */
#define X_SUSPENDED     22      /* ast state from non-ACTIVATED & non-DISABLED
                                   set in stop_request; prestage cancel */

/** Table Sizes **/
define MAX_SPEC_KEYS   10              /* maximum number of special keys */ define MAX_ACTN_KEYS   50              /* maximum number of defined action
                                           keys */
#define MAX_BUTTON_TAB  200             /* maximum number of button request
                                           entries */ define DELTA_TIME_LENGTH  16           /* for: <0 00:00:00.00>  */
                                        /* system constraint - don't change */

/** Macros **/
#define CLR_STR_BUF(X,LEN)      {int k; for(k=0; k < LEN; k++) X[k] = '\0';}
#define BOUNDS_MATCH(X,Y)       ((X->x1 == Y->x1  && \
                                X->y1 == Y->y1  && \
                                X->x2 == Y->x2  && \
                                X->y2 == Y->y2) ? TRUE : FALSE )
#define MIN(A,B)                ((A) < (B) ? (A) : (B))
#define MAX(A,B)                ((A) > (B) ? (A) : (B))

/** CONSTANTS FOR "add_ast"/"del_ast" ROUTINES **/
#define GETKEYAST       10
#define MSENTERAST      20
#define MSEXITAST       30
```

```
#define BUTTONAST    40
#define TIMERAST     50
#define SPECIALKEYAST 90
#define STRINGAST    91
#define CURSORAST    92
#define DEFXAST      93
/**

**/
#define MAX_COMMAND_LEN 80   /* don't change */
#define TERM_MSG_LEN    84   /* don't change */
#define NO_TASKID_DIGITS 1   /* changes with number of allowed tasks :
                                1 = 0 - 9 tasks, 2 = 00 - 99 tasks */

/* end INPUT      */

/* DISPLAY defines */
#define CENTROID_RADIUS 10
#define POINT_SELECT_RADIUS 10
#define MAX_WORLD_X 100000
#define MAX_WORLD_Y 100000
#define SCR_X_WC_TO_CM 0.0326172    /* 33.4 / 1024 */
#define SCR_Y_WC_TO_CM 0.0326389    /* 28.2 / 864 */
#define SCR_X_CM_TO_WC 30.65868     /* 1024 / 33.4 */
#define SCR_Y_CM_TO_WC 30.638298    /* 864 / 28.2 */
#define LINE_HEIGHT_FACTOR 1.3
#define MAX_NUMB_FONTS 14
#define GET_BLOCK_NUMBER 1
#define RETURN_BLOCK_NUMBER 2
#define SELECT_BOX_SPACER 5
#define REVERSE_VIDEO 1

/* end display */ define LETTER 'a'
define DIGIT '0'
#define SIGN '+'
define PUNCTUATION '?' define MAX_GROUP 20
define MAX_GROUP_NESTING 25
#define MAXPROC 500
#define MAXWHEN 300
#define MAXMENU 30
#define MAX_CHOICES 20
define MAX_INV_RETRV_NAMES 15 define MAX_OBJ_SIZE 5000
define MAX_VECTOR_ARRAY_POINTS 500
#define MAX_TASKS 5

/**

**/
define MAX_FONT_ID_LENGTH 31   /* system limit */ define MAX_SCREEN_WIDTH 1024
define MAX_SCREEN_HEIGHT 864

/*   INTERPRETER DEFINITIONS    */ define OBJECT 0
define SUBOBJECT 1
#define SETCOND 1
```

```
#define STARTED 2
#define STOPPED 3
#define VARIABLE_PUT 1
define CURSOR_PUT 2 define SPIRITREQ      19
define MSENTERREQ     21
#define MSEXITREQ      22
#define ACTNKEYREQ     23
#define BUTTONREQ      24
#define TIMERREQ       25
#define CURSORREQ      26
#define STRINGREQ      27
#define STARTASTREQ    28    /* start AST request (by ast ID) */
#define STOPASTREQ     29    /* stop AST request (by ast ID) */
#define SPCLKEYREQ     30    /* set up a special key request */
#define MENUREQ        31
#define RUNREQ         32
#define POPREQ         33
#define MONITORREQ     34
#define WHENEVERREQ    35
#define GETFILEREQ_END 36    /* sent to idp when filename recieved by tp */
#define RETRIEVE_NAMEREQ 37
#define RETRIEVE_OBJREQ 38
#define LOCATORREQ     41

/* softkey tokens */
#define STARTTASKREQ   1
#define SWITCHREQ      2
#define DELETETASKREQ  3
#define HALTREQ        4
#define RERUNREQ       5
#define CONTINUEREQ    6
#define EXITREQ        8
#define GETFILEREQ     10
#define SHUTDOWN       -10
/**

**/ define STRLEN 132
define LINELEN 300 define STACK_SIZE 50 define RESWORDNUM 200
define RESWORDGAP 100
#define KEYWORDNUM 1
#define KEYWORDGAP 199
#define MAXCONST    10000   /*6000*/    /* 2000 */
#define CNUMB       1000
#define MAXSTR      5000    /*2000*/
#define SNUMB       11000   /*7000*/    /* 3000 */
#define MAXVAR      2000
#define VNUMB       16000   /*9000*/    /* 5000 */
#define MAXARY      2000   /* must be the same as MAXVAR */
#define ARYNUMB     18000   /*11000*/   /* 7000 *//* indexes into the same table
                                    as the variables */
#define MAXLAB      1000
define LNUMB       20000   /*13000*/   /* 9000 */ define MAXPARAM    300
define PARAMNUMB   700
```

```
#define ARNUMB     50
#define MAXTP      20
#define MAXOPS     100

/**

**/
            /*   TASK STATUSES    */
/* #define NULL       0    as defined in stdio    */
#define ACTIVE     1
#define IN_STOP    2
#define IN_INPUT   3
#define W_SLEEP    4
#define W_FILE     6
#define W_INPUT    7
#define W_PROC     8
#define W_RET_SAV  9
#define W_GROUP    10
#define IN_STOP_W_INPUT 14
#define W_WAIT 15
#define W_PARAMETER 16
#define W_IDENTIFY 17
#define DONE       18

/**

**/

/*                    COMMAND WORD LIST       */

/*         TOKEN         ICODE      WORD-CLASS      COMMENTS        */
/*         -----         -----      ----------      --------        */ define ASSIGN           102
define CHANGE           104
#define CLEAR            106
#define CLONE            108
#define FLEX_CLOSE       110
#define COPY             112
define CREATE           114 define DECLARE          116
define FLEX_DELETE      118
#define DISPLAY          120
define DRAW             122 define FILL             124
define FLIP             126
#define GET              128
#define GROUP            130
#define HIGHLIGHT        132
#define IDENTIFY         134
#define LOCATE           136
define MODIFY           138 define MOVE             140
define MOVE_OBJECT      142
#define MOVE_WINDOW      144
#define FLEX_OPEN        146
#define POP              148
#define PUT              150
#define REFRESH          152
#define RESET            153
#define RESIZE           154
#define RETRIEVE         156
```

```
#define ROTATE          158
#define SAVE            160
#define SCROLL          162
#define SET             164
#define SWAP            166
#define UNGROUP         168
#define UNHIGHLIGHT     170
#define FLEX_WAIT       172
#define ZOOM            174
/**

**/
```

```
/*                      PARAMETER DEFINITIONS define ALIGNMENT       703
define ANGLE           706
#define ARC_CENTER_X    709
#define ARC_CENTER_Y    712
#define AREA_TYPE       713
#define BANNER          715
#define BANNER_STRING   718
#define BITS_PER_PIXEL  721
#define BORDER          724
#define BUTTON          727
#define CENTER          730
#define CENTROID_X      733
#define CENTROID_Y      736
define COLOR           739 define CLOSE_ON        740
define CURSOR_TYPE     741
#define DEGREES         742
#define CONVERSION      743
#define DIAGONAL_POINT  744
define DIMENSION       745 define DIRECTION       748
define DURATION        751
#define ECHO            753
#define ELEMENTS        755
#define ENDPOINT        758
#define EXIT_STATUS     759
#define X_ENDPOINT      761
#define Y_ENDPOINT      764
#define FACTOR          767
#define FONT            770
#define FONT_PATH       773
#define HEIGHT          776
#define HIGHLIGHT_IND   779
#define INIT_VALUE      782
#define INTENSITY       785
#define JOINING         788
#define KEY_NAME        791
#define KEYBOARD_ICON   794
#define LENGTH          800
#define LINESTYLE       803

/**
```

```
**/
#define LINEWIDTH           806
#define LOCATION            809
#define LOCATION_X          812
#define LOCATION_Y          815
#define LOCK                816
#define X_RADIUS            818
#define MAGNIFICATION       819
#define MENU_ICON           821
#define METHOD              824
#define NUMERIC_INIT_VALUE 826
#define Y_RADIUS            827
#define OBJECT_TYPE         828
#define ORIENTATION         830
#define PARAMETER           833
#define PATTERN             836
#define POINTER             839
#define POINTS              842
#define POSITION            845
#define RADIUS              848
#define RASTER_HEIGHT       851
#define RASTER_WIDTH        854
#define RECT_HEIGHT         857
#define RECT_WIDTH          860
#define RESIZE_DIRECTION    863
#define SCREEN_HEIGHT       869
#define SCREEN_LOCATION     872
#define SCREEN_WIDTH        875
#define SELECT_LL_X         878
#define SELECT_LL_Y         881
#define SELECT_UR_X         884
#define SELECT_UR_Y         887
#define SIZE                890
#define SPACING             893
#define START_DEGREE        896
#define START_POSITION      899
#define STOP_DEGREE         902
#define STRING_WIDTH        904
#define STRING_LENGTH       905
#define STRING_HEIGHT       906
#define STRING_INIT_VALUE   907
#define STRING_VALUE        908
#define SUBSTRING           911
#define TASK_ICON           914
#define TEXTSTYLE           917
#define TITLE               918
#define TYPE                920
#define WIDTH               923
#define WINDOW_NAME         925
#define WINDOW_TYPE         930
#define X_DIAGONAL_POINT    933
#define Y_DIAGONAL_POINT    934
#define TEXT_HEIGHT         938
#define POLYGON_POINTS      939
#define POLYLINE_POINTS     940
#define LINE_LENGTH         941
#define POP_LOCATION        942
#define CLONE_LOCATION      943
#define COPY_LOCATION       944
#define CREATE_LOCATION     945
#define GET_LOCATION        946
#define IDENTIFY_LOCATION   947
#define MOVE_LOCATION       948
#define PUT_LOCATION        949
```

```
#define ROTATE_LOCATION 950
#define ZOOM_DIRECTION 951
#define ZOOM_FACTOR    952
#define RESIZE_FACTOR  953
#define MAGNIFICATION  954
#define SCROLL_DIRECTION 955
#define SCROLL_FACTOR  956
#define ROTATE_FACTOR  957
#define ARC_POINTS     958
#define CHORD_POINTS   959
#define CIRCLE_POINTS  960
#define PIE_POINTS     961
```

/**

**/

/*            DEVICE DEFINITIONS                      */

```
#define CURSOR         540
#define FILE_DEVICE    545
#define KEY            550
#define KEYBOARD       553
#define TIMER          555
```

/*            INPUT-TYPE DEFINITIONS                  */

```
#define CURSOR_LOCATION      700
#define KEYBOARD_INPUT       710
```

/*            CONTROL WORD DEFINITIONS                         */

```
#define BEGIN          200
#define BREAK          205
#define FLEX_DO        210
#define ENDPROC        215
#define ENDIF          220
#define ENDMAIN        225
#define ENDSETUP       230
#define ENDWHILE       235
#define FLEX_EXIT      236
#define FLEX_GOTO      237
#define FLEX_IF        240
#define FLEX_MAIN      245
#define OTHERWISE      250
#define FLEX_RUN       253
#define SETUP          255
#define FLEX_SLEEP     257
#define START          260
#define STOP           265
#define THEN           275
#define WAKEUP         278
```

/*            ARITHMATIC STATEMENTS          */

```
#define ARITHNUM 0
```
/**

**/

```
/*              OPERATOR DEFINITIONS                           */

/*      TOKEN          I-CODE         WORD-CLASS      COMMENTS                 */
/*      -----          ------         ----------      --------                 */ define AND            300            /* Operator                              */
define NOT            305            /* Operator       ???                    */
#define OR             310            /* Operator                              */
/*      (...           ---               Operator                              */
/*      )              ---                Operator                             */
/*      {...}          ---               Operator                              */
/*      [...]          ---               Operator                              */
#define DIVIDE         325            /* Operator       / sign                 */
#define MULTIPLY       330            /* Operator       * sign                 */
#define PLUS           335            /* Operator       + sign                 */
#define MINUS          340            /* Operator       - sign                 */
#define POWER          350            /* Operator       ^ sign                 */
/*      "..."                            Operator       "A/N/S"                */
#define EQUAL          360            /* Ambiguous      = sign                 */
#define EOL            -2             /*                . end of line          */
#define END            -1
#define ENDMARKER      -3             /* marks the end of expressions */
#define ERR            -4             /*                                       */
#define EQ             360            /* Operator       = sign                 */
#define LT             365            /* Operator       < sign                 */
#define LE             370            /* Operator       <= sign                */
#define GT             375            /* Operator       > sign                 */
#define GE             380            /* Operator       >= sign                */
#define NE             385            /* Operator       != sign                */
#define ASSIGNMENT     362            /* Operator       = sign for assining    */
#define NEGATE         386            /* Operator       - sign                 */

/**

**/
/*              OBJECT DEFINITION                               */ define ALL            600
define ARC            605
#define ARRAY          610
#define BOX            615
#define CHORD          617
#define CIRCLE         620
#define IMAGE          625
#define LINE           630
#define MENU           632
#define NUMERIC        635
#define OVAL           640
#define PIE            643
#define POINT          645
#define POLYGON        650
#define POLYLINE       655
/*   string and text should have the same define value */
#define STRING         660
#define TEXT           660
#define WINDOW         665
```

```
/*                  PARAMETER VALUE DEFINITIONS                              */

/********** WORLDS ******************/
#define REAL            2               /**** DEFAULT ****/
#define SPIRIT          1

/*********** LINEWIDTH's **************/
#define EXTRA_FINE      1
#define FINE            2
#define NORMAL          3               /**** DEFAULT ****/
#define BOLD            4
#define EXTRA_BOLD      5

/*********** PATTERNS ***************/  /* specific values */
#define BACKGROUND      1
#define CHECKED         19              /**** DEFAULT ****/
#define CROSS_HATCH     20
#define STRIPED         3
/**

**/
/*********** LINESTYLE *************/   /* specific values */
#define DASHED          1048575
#define DOTTED          15790320
#define SOLID           -1              /**** DEFAULT ****/

/*********** DIRECTIONS ************/
#define DOWN            1               /**** DEFAULT ****/
#define LEFT            2       /* also used for ALIGNMENTS */
#define RIGHT           3       /* also used for ALIGNMENTS */
#define UP              4

/********** ALIGNMENTS *************/
#define CENTER          1               /**** DEFAULT ****/
/*      LEFT                    - as defined under DIRECTIONS */
/*      RIGHT                   - as defined under DIRECTIONS */

/**********************************/
#define IN              1               /**** DEFAULT ****/
#define OUT             2

/**********************************/
#define SMALLER         -1
#define LARGER          1               /**** DEFAULT ****/.

/**********************************/
#define BEGINNING       1
#define CURRENT_POSITION 2              /**** DEFAULT ****/

/********** STRING UNITS ***********/
#define TEXT_CHARACTER  1
#define TEXT_WORD       2
#define TEXT_LINE       3
#define TEXT_NUMERIC    4

/********* BUTTONS ****************/
#define BUTTON_1        400             /**** DEFAULT ****/
#define BUTTON_2        401
#define BUTTON_3        402

/********* TEXTSTYLES **************/
#define ITALICS         1
/* define BOLD          same as linestyle */   /**** DEFAULT ****/

/**
```

```
**/
/********** SETUP KEYS *************/
#define F11             291
#define F12             292
#define F13             293
#define F14             294
#define HELP_KEY        295             /** f15 **/
#define DO_KEY          296             /** f16 **/
#define F17             297
#define F18             298
#define F19             299
#define F20             300
#define KP_PF1          256
#define KP_PF2          257
#define KP_PF3          258
#define KP_PF4          259
#define KP_7            267
#define KP_8            268
#define KP_9            269
#define KP_4            264
#define KP_5            265
#define KP_6            266
#define KP_1            261
#define KP_2            262
#define KP_3            263
#define KP_0            260
#define KP_PERIOD       273
#define KP_ENTER        270
#define KP_MINUS        271
#define KP_COMMA        272
            /* arrow keys */
#define UP_KEY          274
#define DOWN_KEY        275
#define LEFT_KEY        276
#define RIGHT_KEY       277

/********** CLOSE METHOD *************/
#define SLIDE_OFF       1               /**** DEFAULT ****/
#define EXIT            2

/********** COLORS *****************/
#define BLACK           1
#define BLUE            2
#define GREEN           3
#define RED             4
#define YELLOW          5
#define WHITE           6               /**** DEFAULT ****/

/*********************************/
#define ON              1
#define OFF             0
/**
**/
/*********************************/
#define X_DIRECTION     1
#define Y_DIRECTION     2
#define XY_DIRECTION    3               /**** DEFAULT ****/

/*********** CURSOR TYPES ************/
#define ARROW           1               /**** DEFAULT ****/
#define COORDINATE      2
#define CROSSHAIR       3
#define FATBITS         4
#define TEXT_CURSOR     5
#define STRETCH_BOX     6
#define STRETCH_LINE    7
#define STRETCH_POLYLINE 8
```

```
/**********************************/
#define LOCKED           1
#define UNLOCKED         0              /**** DEFAULT ****/

/************ FONTS *******************/
#define SYSTEMFONT            9  /* UIS font 9 */    /**** DEFAULT ****/
#define BOLD_SYSTEMFONT      10  /* UIS font 10 */
#define WIDE_12_POINT         3  /* UIS font 3 */
define BOLD_WIDE_12_POINT    4  /* UIS font 4 */ define CLICKED          1
define RELEASED         0

/**********************************/
#define ENTERS           1
#define EXITS            2

/**********************************/
#define DEFAULT_COORD    0
#define NEW_COORD        1

/**********************************/
#define WHENEVER         1
#define MENU             2

/**********************************/
#define ABSOLUTE         1              /**** DEFAULT ****/
#define RELATIVE         2
/**

**/
/**********************************/
#define LEFT_TO_RIGHT    0              /**** DEFAULT ****/
#define TOP_TO_BOTTOM    1

/**********************************/
#define HIGHLIGHTED      0
#define UNHIGHLIGHTED    1
#define ERASE            2

/************* SAVE TYPES *************/
#define OBJECT_SAVE      1
#define WORLD_SAVE       2
#define SPIRIT_SAVE      3

/*************************************/
#define PUSH_WINDOW 50
#define POP_WINDOW  51

/*************************************/
#define MAXIMUM      9999

/*              EMPTY WORD DEFINITIONS                      */ define A                1
define AN               1
#define AREA             1
#define AROUND           1
#define AS               1
#define AT               1
#define CONTINUING       1
#define CALLED           1
#define CHARACTERS       1
#define CHOICES          1
#define CONDITION        1
```

```
#define FOR                 1
#define FROM                1
#define HAVE                1
#define INTO                1
#define IS                  1
#define LOCATIONS           1
#define MONITOR_WINDOW      1
#define NAMED               1
#define NEAR                1
#define WORLD               1
#define OBJECTS             1
#define OF                  1
#define RETURNING           1
#define SAVING              1
#define STARTING            1
#define THE                 1
#define TO                  1
#define WHEN                1
#define WITH                1
#define WITHIN              1

/**
**/
/****                  EVENT FLAG LIST                              ****/
#define EF_MAIL_WRITE_ATTENTION    10
#define EF_MAIL_RECEIVE            11
#define EF_MAIL_SEND               12
#define WAITFLAG                   13
```

APPENDIX_D

Copyright Eastman Kodak Company 1988

```
begin main.

declare display_value as a string with initial value "0".
declare display_value2 as a string with initial value "0".
declare register1 as a numeric with initial value 0.
declare register2 as a numeric with initial value 0.
declare register3 as a numeric with initial value 0.
declare decimal as a numeric with initial value 0.
declare clr_flag as a numeric with initial value 0.

open a window named calc_window with
                banner off
                screen_location 400,400
                screen_width 350
                screen_height 250.

retrieve key_30 into the spirit world.
retrieve keyrt into the spirit world.
retrieve keypwr into the spirit world.
retrieve keyquit into the spirit world.
```

```
display key_30 at location 150,10.
draw a text key0_desc at location 157,20 with value "0" font bold_wide_12_point.

copy key_30 as keypd at location 200,10.
draw a text keypd_desc at location 209,20 with value "."
   font bold_wide_12_point.
copy key_30 as keycls at location 250,10.
draw a text keycls_desc at location 255,20 with value "CLS" font systemfont.
copy key_30 as keypls at location 300,10.
draw a text keypls_desc at location 307,20 with value "+"
   font bold_wide_12_point.

copy key_30 as key1 at location 150,60.
draw a text key1_desc at location 157,70 with value "1" font bold_wide_12_point.
copy key_30 as key2 at location 200,60.
draw a text key2_desc at location 207,70 with value "2" font bold_wide_12_point.
copy key_30 as key3 at location 250,60.
draw a text key3_desc at location 257,70 with value "3" font bold_wide_12_point.
copy key_30 as keymns at location 300,60.
draw a text keymns_desc at location 307,70 with value "-"
   font bold_wide_12_point.

copy key_30 as key4 at location 150,110.
draw a text key4_desc at location 157,120 with value "4"
   font bold_wide_12_point.
copy key_30 as key5 at location 200,110.
draw a text key5_desc at location 207,120 with value "5"
   font bold_wide_12_point.
copy key_30 as key6 at location 250,110.
draw a text key6_desc at location 257,120 with value "6"
   font bold_wide_12_point.
copy key_30 as keymul at location 300,110.
draw a text keymul_desc at location 307,120 with value "X"
   font bold_wide_12_point.

copy key_30 as key7 at location 150,160.
draw a text key7_desc at location 157,170 with value "7"
   font bold_wide_12_point.
copy key_30 as key8 at location 200,160.
draw a text key8_desc at location 207,170 with value "8"
   font bold_wide_12_point.
copy key_30 as key9 at location 250,160.
draw a text key9_desc at location 257,170 with value "9"
   font bold_wide_12_point.
copy key_30 as keydiv at location 300,160.
draw a text keydiv_desc at location 307,170 with value "/"
   font bold_wide_12_point.

copy key_30 as keyent at location 100,10.
draw a text keyent_desc at location 105,20 with value "ENT" font systemfont.

copy key_30 as keysto at location 20,10.
draw a text keysto_desc at location 25,20 with value "STO" font systemfont.

copy key_30 as keyrec at location 20,60.
draw a text keyrec_desc at location 25,70 with value "REC" font systemfont.

copy key_30 as keyx1 at location 20,110.
draw a text keyx1_desc at location 25,120 with value "X1" font systemfont.

copy key_30 as keyx2 at location 20,160.
draw a text keyx2_desc at location 25,170 with value "X2" font systemfont.

display keyrt at location 100,60.
display keypwr at location 100,110.
display keyquit at location 100,160.
```

```
draw a box display_box at location 50,220 with width 280 height 22.
draw a text display_string at location 320,225 with
    font bold_wide_12_point alignment right color 101 value display_value .

draw a box display_box2 at location 50,200 with width 180 height 15 linewidth 2.
draw a text display_string2 at location 220,204 with value display_value
    font systemfont alignment right color 101.

setup a condition named cond_key0 such that whenever
    the button button_1 is clicked within the object key_30 then:
    if clr_flag = 1
        then:   clr_flag = 0.
                display_value = "0".
    endif.
    assign to display_value the joining of display_value with "0".
    modify display_string to have value display_value.
    assign to register1 the numeric value of display_value.
endsetup.

setup a condition named cond_key1 such that whenever
    the button button_1 is clicked within the object key1 then:
    if clr_flag = 1
        then:   clr_flag = 0.
                display_value = "0".
    endif.
    assign to display_value the joining of display_value with "1".
    modify display_string to have value display_value.
    assign to register1 the numeric value of display_value.
endsetup.

setup a condition named cond_key2 such that whenever
    the button button_1 is clicked within the object key2 then:
    if clr_flag = 1
        then:   clr_flag = 0.
                display_value = "0".
    endif.
    assign to display_value the joining of display_value with "2".
    modify display_string to have value display_value.
    assign to register1 the numeric value of display_value.
endsetup.

setup a condition named cond_key3 such that whenever
    the button button_1 is clicked within the object key3 then:
    if clr_flag = 1
        then:   clr_flag = 0.
                display_value = "0".
    endif.
    assign to display_value the joining of display_value with "3".
    modify display_string to have value display_value.
    assign to register1 the numeric value of display_value.
endsetup.

setup a condition named cond_key4 such that whenever
    the button button_1 is clicked within the object key4 then:
    if clr_flag = 1
        then:   clr_flag = 0.
                display_value = "0".
    endif.
    assign to display_value the joining of display_value with "4".
    modify display_string to have value display_value.
    assign to register1 the numeric value of display_value.
endsetup.

setup a condition named cond_key5 such that whenever
    the button button_1 is clicked within the object key5 then:
    if clr_flag = 1
        then:   clr_flag = 0.
                display_value = "0".
```

```
        endif.
        assign to display_value the joining of display_value with "5".
        modify display_string to have value display_value.
        assign to register1 the numeric value of display_value.
endsetup.

setup a condition named cond_key6 such that whenever
    the button button_1 is clicked within the object key6 then:
    if clr_flag = 1
        then:   clr_flag = 0.
                display_value = "0".
    endif.
    assign to display_value the joining of display_value with "6".
    modify display_string to have value display_value.
    assign to register1 the numeric value of display_value.
endsetup.

setup a condition named cond_key7 such that whenever
    the button button_1 is clicked within the object key7 then:
    if clr_flag = 1
        then:   clr_flag = 0.
                display_value = "0".
    endif.
    assign to display_value the joining of display_value with "7".
    modify display_string to have value display_value.
    assign to register1 the numeric value of display_value.
endsetup.

setup a condition named cond_key8 such that whenever
    the button button_1 is clicked within the object key8 then:
    if clr_flag = 1
        then:   clr_flag = 0.
                display_value = "0".
    endif.
    assign to display_value the joining of display_value with "8".
    modify display_string to have value display_value.
    assign to register1 the numeric value of display_value.
endsetup.

setup a condition named cond_key9 such that whenever
    the button button_1 is clicked within the object key9 then:
    if clr_flag = 1
        then:   clr_flag = 0.
                display_value = "0".
    endif.
    assign to display_value the joining of display_value with "9".
    modify display_string to have value display_value.
    assign to register1 the numeric value of display_value.
endsetup.

setup a condition named cond_keycls such that whenever
    the button button_1 is clicked within the object keycls then:
    display_value = "0".
    modify display_string to have value "0".
    register1 = 0.
    register2 = 0.
    register3 = 0.
    decimal = 0.

endsetup.

setup a condition named cond_keypd such that whenever the
    button button_1 is clicked within the object keypd then:
    if decimal = 0
        then:   assign to display_value the joining of display_value with ".".
                decimal = 1.
```

```
      endif.
   modify display_string to have value display_value.
endsetup.

setup a condition named cond_keypls such that whenever the
   button button_1 is clicked within the object keypls then:
   register3 = register1 + register2.
   assign to display_value the string value of register3.
   modify display_string to have value display_value.
   register2 = register3.
   clr_flag = 1.
   decimal = 0.
endsetup.

setup a condition named cond_keymns such that whenever the
   button button_1 is clicked within the object keymns then:
   register3 = register2 - register1.
   assign to display_value the string value of register3.
   modify display_string to have value display_value.
   register2 = register3.
   clr_flag = 1.
   decimal = 0.
endsetup.

setup a condition named cond_keymul such that whenever the
   button button_1 is clicked within the object keymul then:
   register3 = register2 * register1.
   assign to display_value the string value of register3.
   modify display_string to have value display_value.
   register2 = register3.
   clr_flag = 1.
   decimal = 0.
endsetup.

setup a condition named cond_keydiv such that whenever the
   button button_1 is clicked within the object keydiv then:
   register3 = register2 / register1.
   assign to display_value the string value of register3.
   modify display_string to have value display_value.
   register2 = register3.
   clr_flag = 1.
   decimal = 0.
endsetup.

setup a condition named cond_keyrt such that whenever the
   button button_1 is clicked within the object keyrt then:
   register3 = register2 ^ (1 / register1).
   assign to display_value the string value of register3.
   modify display_string to have value display_value.
   register2 = register3.
   clr_flag = 1.
   decimal = 0.
endsetup.

setup a condition named cond_keypwr such that whenever the
   button button_1 is clicked within the object keypwr then:
   register3 = register2 ^ register1.
   assign to display_value the string value of register3.
   modify display_string to have value display_value.
   register2 = register3.
   clr_flag = 1.
   decimal = 0.
endsetup.
```

```
setup a condition named cond_keyent such that whenever the
    button button_1 is clicked within the object keyent then:
    assign to register2 the numeric value of display_value.
    display_value = "0".
    modify display_string to have value "0".
    register1 = 0.
    clr_flag = 1.
    decimal = 0.
endsetup.

setup a condition named cond_keysto such that whenever the
    button button_1 is clicked within the object keysto then:
    display_value2 = display_value.
    delete display_string2.
    draw a text display_string2 at location 220,203 with value display_value2
    font systemfont alignment right color 101.
endsetup.

setup a condition named cond_keyrec such that whenever the
    button button_1 is clicked within the object keyrec then:
    display_value = display_value2.
    modify display_string to have value display_value.
    assign to register1 the numeric value of display_value.
    decimal = 0.
endsetup.

setup a condition named cond_keyx1 such that whenever the
    button button_1 is clicked within the object keyx1 then:
    delete display_string.
    draw a text display_string at location 320,225 with value display_value
    font bold_wide_12_point alignment right color 101.
endsetup.

setup a condition named cond_keyx2 such that whenever the
    button button_1 is clicked within the object keyx2 then:
    delete display_string.
    draw a text display_string at location 320,225 with value display_value
    font bold_wide_12_point alignment right color 101.
endsetup.

setup a condition named cond_keyquit such that whenever the
    button button_1 is clicked within the object keyquit then:
    wakeup.
endsetup.

start the condition named cond_key0.
start the condition named cond_key1.
start the condition named cond_key2.
start the condition named cond_key3.
start the condition named cond_key4.
start the condition named cond_key5.
start the condition named cond_key6.
start the condition named cond_key7.
start the condition named cond_key8.
start the condition named cond_key9.
start the condition named cond_keypd.
start the condition named cond_keycls.
start the condition named cond_keypls.
start the condition named cond_keymns.
start the condition named cond_keymul.
start the condition named cond_keydiv.
start the condition named cond_keyrt.
start the condition named cond_keypwr.
start the condition named cond_keyent.
```

```
start the condition named cond_keysto.
start the condition named cond_keyrec.
start the condition named cond_keyquit.

sleep.

endmain.

Copyright Eastman Kodak Company 1988 setup a condition named redesign_cond such that whenever the
    button button_1 is clicked within the object toolredesign then:

get the cursor location from the window into x_pos1,y_pos1 when
    button_1 clicks within the selected window.
    identify into name_var the object name at location  x_pos1,y_pos1.
    modify name_var to have color 177.

get the cursor location from the window into x_pos1,y_pos1 when
 button_1 clicks within the selected window.
        identify into name_var2 the object name at location   x_pos1,y_pos1.
    modify name_var2 to have color 177.

modify name_var to have color 101.
    modify name_var2 to have color 101.

swap the positions of name_var and name_var2.

endsetup.
```

We claim:

1. A method of operating a computer system for generating a human-computer interface prototype, the computer system including a display and means for indicating an x,y location on the display and generating an asynchronous event, comprising the steps of:
   a. describing an interface prototype in a high-level graphics language having a command for describing a graphic object that creates a graphic item on the display and links a specific behavior to the graphic item in response to an asynchronous event occurring within the graphic item, the object being defined independently of the x,y location of the graphic item on the display;
   b. compiling the high-level graphic language description to produce an intermediate low level code optimized for interpretation; and
   c. interpreting the intermediate lowlevel code produced in the previous step to implement the prototype interface.

2. The method claimed in claim 1, wherein said graphic objects have a data structure that includes bit maps and display lists.

3. The method claimed in claim 1, further including the step of: creating graphic objects for use in the interface prototype with a graphic editor.

4. The method claimed in claim 2, further including the step of: storing said graphic objects in a data base where bit maps and display lists are treated the same.

5. The method claimed in claim 3, wherein the graphic editor is written in the high-level graphics language, and including the step of: modifying the characteristics and behavior of the graphic editor while the graphics editor is running in a runtime environment.

6. The method claimed in claim 1, wherein the command is a SETUP command that specifies a graphic item, an asynchronous event, and a behavior when the asynchronous event occurs within the graphic item, the behavior being specified by a list of high level graphic language commands.

* * * * *